US012771497B2

(12) United States Patent
Zou et al.

(10) Patent No.: US 12,771,497 B2
(45) Date of Patent: Oct. 20, 2026

(54) HANDLING OF MEDIUM ACCESS CONTROL (MAC) ENTITY DURING SECONDARY CELL GROUP (SCG) DEACTIVATION/REACTIVATION

(71) Applicant: Telefonaktiebolaget LM Ericsson (publ), Stockholm (SE)

(72) Inventors: Zhenhua Zou, Solna (SE); Jens Bergqvist, Linköping (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 123 days.

(21) Appl. No.: 18/569,354

(22) PCT Filed: Jun. 28, 2022

(86) PCT No.: PCT/EP2022/067645

§ 371 (c)(1),
(2) Date: Dec. 12, 2023

(87) PCT Pub. No.: WO2023/011806

PCT Pub. Date: Feb. 9, 2023

(65) Prior Publication Data

US 2024/0223326 A1 Jul. 4, 2024

Related U.S. Application Data

(60) Provisional application No. 63/229,570, filed on Aug. 5, 2021.

(51) Int. Cl.
*H04L 5/00* (2006.01)
*H04W 28/02* (2009.01)
*H04W 56/00* (2009.01)

(52) U.S. Cl.
CPC .......... *H04L 5/0044* (2013.01); *H04L 5/0098* (2013.01); *H04W 28/0278* (2013.01); *H04W 56/0005* (2013.01)

(58) Field of Classification Search
CPC ..... H04L 5/0044; H04L 5/0098; H04L 5/001; H04L 5/0053; H04L 1/1812;
(Continued)

(56) References Cited

U.S. PATENT DOCUMENTS 10,764,018 B2 9/2020 Qiu et al.
12,289,678 B2 4/2025 Xu et al.
(Continued)

FOREIGN PATENT DOCUMENTS

EP 3360381 B1 4/2019
EP 3716697 B1 6/2025
(Continued)

OTHER PUBLICATIONS

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.
(Continued)

*Primary Examiner* — Luat Phung
(74) *Attorney, Agent, or Firm* — Murphy, Bilak & Homiller, PLLC

(57) ABSTRACT

Embodiments include methods for a user equipment (UE) configured to communicate with a wireless network via a plurality of cell groups (e.g., MCG and SCG). Such methods include, upon deactivating one of the cell groups (e.g., SCG), suspending a medium access control (MAC) entity associated with the deactivated cell group and performing one or more first operations on the MAC entity upon the
(Continued)

suspension of the MAC entity. Such methods also include, while the MAC entity is suspended, performing one or more second operations related to reporting of uplink (UL) data available for transmission via the deactivated cell group. Such methods also include, upon reactivating the deactivated cell group, performing one or more third operations on the MAC entity and resuming the MAC entity based on the one or more third operations. Other embodiments include UEs configured to perform such methods.

20 Claims, 16 Drawing Sheets

(58) Field of Classification Search
CPC ......... H04W 28/0278; H04W 56/0005; H04W 72/52; H04W 52/0216; H04W 52/0254; H04W 72/0453; H04W 76/27; H04W 72/21; H04W 76/15; Y02D 30/70
See application file for complete search history.

(56) References Cited

U.S. PATENT DOCUMENTS

| | | | | |
|---|---|---|---|---|
| 2019/0207737 | A1* | 7/2019 | Babaei | H04B 7/0617 |
| 2022/0046522 | A1* | 2/2022 | Kim | H04W 48/16 |
| 2023/0247501 | A1* | 8/2023 | Kim | H04W 74/0833 370/331 |
| 2023/0328817 | A1 | 10/2023 | Tsuboi et al. | |
| 2023/0397042 | A1 | 12/2023 | Koskela et al. | |
| 2023/0397297 | A1* | 12/2023 | Zhang | H04W 72/231 |
| 2024/0056150 | A1* | 2/2024 | Yuan | H04W 76/20 |
| 2024/0172306 | A1* | 5/2024 | Wallentin | H04W 28/0278 |
| 2024/0196458 | A1* | 6/2024 | Teyeb | H04W 76/15 |

FOREIGN PATENT DOCUMENTS

| | | | |
|---|---|---|---|
| JP | 2017500794 | A | 1/2017 |
| NZ | 765240 | A | 7/2021 |
| WO | 2020114372 | A1 | 6/2020 |
| WO | 2020167170 | A1 | 8/2020 |
| WO | 2020197306 | A1 | 10/2020 |
| WO | 2021101428 | A1 | 5/2021 |
| WO | 2022144223 | A1 | 7/2022 |

OTHER PUBLICATIONS

"3GPP TS 36.300 V16.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Sep. 2020, pp. 1-390.
"3GPP TS 38.321 V16.2.0", 3rd Generation Partnership Project; Technical Specification Group Radio Access Network; NR; Medium Access Control (MAC) protocol specification (Release 16), Sep. 2020, pp. 1-107.
"3GPP TS 38.321 V16.5.0", 3rd Generation Partnership Project; Technical Specification Group Radio Access Network; NR; Medium Access Control (MAC) protocol specification (Release 16), Jun. 2021, pp. 1-157.
"3GPP TS 38.322 V16.2.0", 3rd Generation Partnership Project; Technical Specification Group Radio Access Network; NR; Radio Link Control (RLC) protocol specification (Release 16), Dec. 2020, pp. 1-33.
"3GPP TS 38.323 V16.2.0", 3rd Generation Partnership Project; Technical Specification Group Radio Access Network; NR; Packet Data Convergence Protocol (PDCP) Specification (Release 16), Sep. 2020, pp. 1-40.
"3GPP TS 38.473 version 16.3.1", ETSI TS 138 473 V16.3.1, 5G; NG-RAN; F1 Application Protocol (F1AP) (Release 16), Nov. 2020, pp. 1-459.
"3GPP TS 37.340 V16.3.0", 3rd Generation Partnership Project; Technical Specification Group Radio Access Network; Evolved Universal Terrestrial Radio Access (E-UTRA) and NR; Multi-connectivity; Stage 2 (Release 16), Sep. 2020, pp. 1-83.
"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.
"Efficient SCG (de)activation", 3GPP TSG-RAN WG2 #114-e, Tdoc R2-2106023, Electronic meeting, May 19-27, 2021, pp. 1-10.
"3GPP TS 36.321 V16.1.0", 3rd Generation Partnership Project; Technical Specification Group Radio Access Network; Evolved Universal Terrestrial Radio Access (E-UTRA); Medium Access Control (MAC) protocol specification (Release 16), Jul. 2020, pp. 1-141.
"3GPP TS 38.423 V16.3.0", 3rd Generation Partnership Project; Technical Specification Group Radio Access Network; NG-RAN; Xn application protocol (XnAP) (Release 16), Sep. 2020, pp. 1-451.
"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.501 V16.7.0", 3rd Generation Partnership Project; Technical Specification Group Services and System Aspects; System architecture for the 5G System (5GS); Stage 2 (Release 16), Dec. 2020, pp. 1-450.
"Views on NR Rel-17", 3GPP TSG RAN Meeting #84, RP-190919, Newport Beach, USA, Jun. 4, 2019, pp. 1-36.
"Report of 3GPP TSG RAN2#107bis meeting, Chongqing, China", 3GPP TSG-RAN WG2 meeting #108, R2-1914301, Oct. 14-18, 2019, pp. 1-283.
"Introducing suspension of SCG", 3GPP TSG RAN WG2 Meeting #107, R2-1908679, Prague, Czech, Aug. 26-30, 2019, pp. 1-4.
"Further consideration on SCG deactivation and activation", 3GPP TSG-RAN WG2 Meeting #112 electronic, R2-2009246, e-meeting, Nov. 2-13, 2020, pp. 1-8.
"Further discussion on suspension of SCG", 3GPP TSG RAN WG2 Meeting #108, R2-1914364, Reno, Nevada, US, Nov. 18-22, 2019, pp. 1-10.
"UE Assistance Information for EN-DC", 3GPP TSG-RAN WG2 Meeting #107, R2-1909868, Prague, Czech Republic, Aug. 26-30, 2019, pp. 1-2.

* cited by examiner

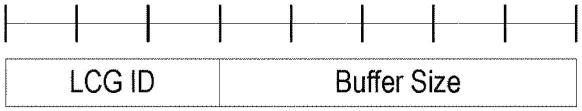

FIG. 14A

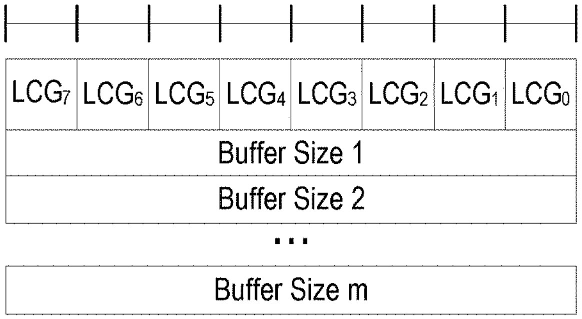

FIG. 14B

```
-- ASN1START
-- TAG-MAC-CELLGROUPCONFIG-START
MAC-CellGroupConfig ::= SEQUENCE {
[...]
    bsr-Config             BSR-Config  OPTIONAL, -- Need M
[...]
}
[...]
-- TAG-MAC-CELLGROUPCONFIG-STOP
-- ASN1STOP
```

FIG. 15B

```
-- ASN1START
-- TAG-CELLGROUPCONFIG-START
CellGroupConfig ::=        SEQUENCE {
    cellGroupId                CellGroupId,
    rlc-BearerToAddModList     SEQUENCE (SIZE(1..maxLC-ID)) OF
                                   RLC-BearerConfig  OPTIONAL, -- Need N
[...]
    mac-CellGroupConfig        MAC-CellGroupConfig  OPTIONAL, -- Need M
[...]
    spCellConfig               SpCellConfig         OPTIONAL, -- Need M
[...]
}
```

FIG. 15A

FIG. 15C

```
-- ASN1START
-- TAG-BSR-CONFIG-START
BSR-Config ::=        SEQUENCE {
    periodicBSR-Timer    ENUMERATED { sf1, sf5, sf10, sf16, sf20, sf32, sf40, sf64, sf80, sf128, sf160, sf320, sf640,
                                      sf1280, sf2560, infinity },
    retxBSR-Timer        ENUMERATED { sf10, sf20, sf40, sf80, sf160, sf320, sf640, sf1280, sf2560, sf5120, sf10240,
                                      spare5, spare4, spare3, spare2, spare1},
    logicalChannelSR-DelayTimer ENUMERATED { sf20, sf40, sf64, sf128, sf512, sf1024,sf2560, spare1} OPTIONAL, -- Need R
    ...
}
-- TAG-BSR-CONFIG-STOP
-- ASN1STOP
```

HANDLING OF MEDIUM ACCESS CONTROL (MAC) ENTITY DURING SECONDARY CELL GROUP (SCG) DEACTIVATION/REACTIVATION

TECHNICAL FIELD

The present disclosure relates generally to wireless networks and more specifically to techniques that reduce the energy consumed by a user equipment (UE) when connected to multiple cell groups in a wireless network, particularly when one of the cell groups is in a deactivated state.

BACKGROUND

Long-Term Evolution (LTE) is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

LTE Rel-10 supports bandwidths larger than 20 MHz. To remain compatible with legacy UEs from earlier releases (e.g., LTE Rel-8), a wideband LTE Rel-10 carrier (e.g., >20 MHz) should appear as a plurality of carriers ("component carriers" or CCs), each preferably having the same structure as an LTE Rel-8 carrier. The Rel-10 UE can received the multiple CCs based on Carrier Aggregation (CA). The CCs can also be considered "cells", such that a UE in CA has one primary cell (PCell) and one or more secondary cells (SCells).

LTE Rel-12 introduced dual connectivity (DC) whereby a UE can be connected to two network nodes simultaneously, thereby improving connection robustness and/or capacity. In LTE DC, these two network nodes are referred to as master eNB (MeNB) and secondary eNB (SeNB), or more generally as master node (MN) and secondary node (SN). In particular, a UE is configured with a Master Cell Group (MCG) associated with the MN and a Secondary Cell Group (SCG) associated with the SN. Each cell group includes a PCell and may include one or more SCells.

Currently the fifth generation ("5G") of cellular systems, also referred to as New Radio (NR), is being standardized within 3GPP. NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with 4G/LTE. For example, both PHYs utilize similar arrangements of time-domain physical resources into 1-ms subframes that include multiple slots of equal duration, with each slot including multiple OFDM-based symbols.

Several DC (or more generally, multi-connectivity) scenarios are considered for NR. These include NR-DC that is similar to LTE-DC mentioned above, except that both the MN and SN (referred to as "gNBs") employ the NR interface to communicate with the UE. In addition, NR supports various multi-RAT DC (MR-DC) scenarios in which a UE can be configured to utilize resources from one node providing E-UTRA/LTE access and another node providing NR access. One node acts as the MN (e.g., providing MCG) and the other as the SN (e.g., providing SCG), with the MN and SN being connected via a network interface and at least the MN being connected to a core network (e.g., EPC or 5GC).

SUMMARY

To improve network energy efficiency and battery life for UEs in MR-DC, 3GPP Rel-17 includes techniques for efficient SCG/SCell activation/deactivation. This can be important for MR-DC configurations with NR SCG since it has been found that, in some cases, NR UE energy consumption is three-to-four times higher than in LTE. However, there are various problems, issues, and/or difficulties with handling of the SCG's MAC entity during de-activation and subsequent re-activation of the SCG.

Embodiments of the present disclosure provide specific improvements to handling of UE MAC entities during cell group (e.g., SCG) deactivation and/or reactivation, such as by facilitating solutions to overcome exemplary problems summarized above and described in more detail below.

Embodiments of the present disclosure include methods (e.g., procedures) for a UE configured to communicate with a wireless network via a plurality of cell groups.

These exemplary methods can include, upon deactivating one of the plurality of cell groups, suspending a MAC entity associated with the deactivated cell group and performing one or more first operations on the MAC entity upon the suspension of the MAC entity. These exemplary methods can also include, while the MAC entity is suspended, performing one or more second operations related to reporting of UL data available for transmission via the deactivated cell group. These exemplary methods can also include, upon reactivating the deactivated cell group, performing one or more third operations on the MAC entity and resuming the MAC entity based on the one or more third operations.

For example, the plurality of cell groups include an MCG and an SCG, where the SCG is the cell group being deactivated and reactivated.

In some embodiments, performing the first operations on the MAC entity upon suspension can include canceling one or more of the following ongoing procedures:

- random access (RA);
- scheduling request (SR);
- power headroom reporting (PHR);
- consistent listen-before-talk (LBT) failure recovery;
- beam failure recovery (BFR);
- pre-emptive buffer status reporting (BSR);
- recommended bit rate query;
- UL configured grant (CG) confirmation;
- sidelink (SL) CG confirmation; and
- desired guard symbol (DSG) query.

In some of these embodiments, one or more of the following applies:

- ongoing RA procedures that are not caused by a BSR pending for transmission are cancelled, while ongoing RA procedures that are caused by a BSR pending for transmission are not cancelled; and
- ongoing SR procedures that are not caused by a BSR pending for transmission are cancelled, while ongoing SR procedures that are caused by a BSR pending for transmission are not cancelled.

In some embodiments, the one or more first operations performed on the MAC entity upon the suspension include maintaining any BSR procedures, for LCHs of the MAC entity, that were ongoing upon the suspension of the MAC entity.

In some embodiments, the one or more first operations performed on the MAC entity upon the suspension include one or more of the following operations:

- setting new data indicators (NDIs) for ongoing UL hybrid ARQ (HARQ) processes to values of zero;
- flushing soft buffers for ongoing downlink (DL) HARQ processes;
- resetting one or more active counters;
- stopping or considering to be expired one or more running timers;
- suspending one or more UL resource grants;
- releasing one or more physical UL control channel (PUCCH) resources; and
- releasing one or more temporary identifiers assigned by the wireless network.

In some of these embodiments, the one or more running timers stopped or considered to be expired include all running timers, except at least one of the following is kept running upon the suspension:

- a first timer that triggers a regular BSR; and
- a second timer that triggers a SR on a primary cell of the deactivated cell group.

In some of these embodiments, the suspended UL resource grants include only type-1 UL CGs for all cells having an associated timer that has not expired. In some of these embodiments, the released PUCCH resources include PUCCH resources for all cells having an associated timer that has not expired, except PUCCH resources for transmitting SR.

In some embodiments, the one or more second operations performed while the MAC entity is suspended include one or more of the following: initiating a BSR procedure to report UL data available for transmission via the deactivated cell group; initiating a SR procedure when no physical UL shared channel (PUSCH) resources are available to transmit a BSR; and initiating a RA procedure when no PUCCH resources are available to transmit a SR.

In some of these embodiments, the SR procedure is initiated with substantially zero delay after determining that no PUSCH resources are available for transmitting a BSR. In other embodiments, initiating the BSR procedure is based on availability of UL data for transmission in a subset of all logical channels (LCHs) of the MAC entity. In some of these embodiments, the subset of LCHs includes one or more of the following:

- only LCHs that are not associated with a split secondary RLC entity;
- only LCHs that belong to a logical channel group (LCG);
- only LCHs that carry delay-sensitive UL data; and
- particular LCHs indicated by the wireless network via RRC signaling.

In other embodiments, the one or more second operations performed while the MAC entity is suspended include the following: monitoring availability of UL data on one or more LCHs of the MAC entity; initiating a SR procedure based on detecting availably of UL data on at least one of the monitored LCHs; and initiating a RA procedure when no PUCCH resources are available to transmit a SR. In some of these embodiments, initiating the SR procedure can be further based on one or more of the following:

- no other SR procedures have been initiated while the MAC entity has been suspended; or
- no physical UL shared channel (PUSCH) resources are available for transmitting a BSR.

In some of these embodiments, the monitored LCHs include one of the following subsets of all LCHs of the MAC entity:

- only LCHs that are not associated with a split secondary RLC entity;
- only LCHs that belong to an LCG;
- only LCHs that carry delay-sensitive UL data; and
- particular LCHs indicated by the wireless network via RRC signaling.

In some embodiments, the one or more third operations performed (2030) upon reactivating the deactivated cell group include one or more of the following:

- resuming one or more suspended UL resource grants; and
- resetting, to a predetermined initial value, respective prioritization parameters associated with a plurality of logical channels of the MAC entity.

In some embodiments, resuming the MAC entity based on the one or more third operations can include one or more of the following (e.g., upon which the MAC entity is considered as resumed):

- initiating or resuming a buffer status reporting procedure for a plurality of logical channels of the MAC entity, based on prioritization parameters associated with the plurality of LCHs being reset to a predetermined initial value;
- sending an acknowledgement to a cell group activation command from the wireless network;
- initiating a SR procedure in the reactivated cell group; and
- initiating a RA procedure in the reactivated cell group.

In some of these embodiments, the predetermined initial value to which the prioritization parameters are reset is zero.

Other embodiments include UEs (e.g., wireless devices, IoT devices, etc. or component(s) thereof) configured to perform operations corresponding to any of the exemplary methods described herein. Other embodiments include non-transitory, computer-readable media storing program instructions that, when executed by processing circuitry, configure such UEs to perform operations corresponding to any of the exemplary methods described herein.

These and other embodiments disclosed herein can facilitate suspension and resumption of a MAC entity to support cell group (e.g., SCG) deactivation and reactivation and its corresponding reduction in UE energy consumption, such as by allowing a UE to trigger a BSR procedure and/or a data volume report in a fast and reliable way. In this manner, the network can be quickly informed about a UE's need for reactivation of a deactivated cell group (e.g., due to arrival of UL data traffic for an SCG), which can reduce and/or minimize transmission latency of UL data.

These and other objects, features, and advantages of embodiments of the present disclosure will become apparent upon reading the following Detailed Description in view of the Drawings briefly described below.

BRIEF DESCRIPTION OF THE DRAWINGS

FIGS. 14A-B show exemplary MAC control elements (CEs) for various buffer status reporting (BSR) formats.

FIGS. 15A-C show ASN.1 data structures for an exemplary CellGroupConfig IE and some of its constituent parts.

DETAILED DESCRIPTION

Figure 1:
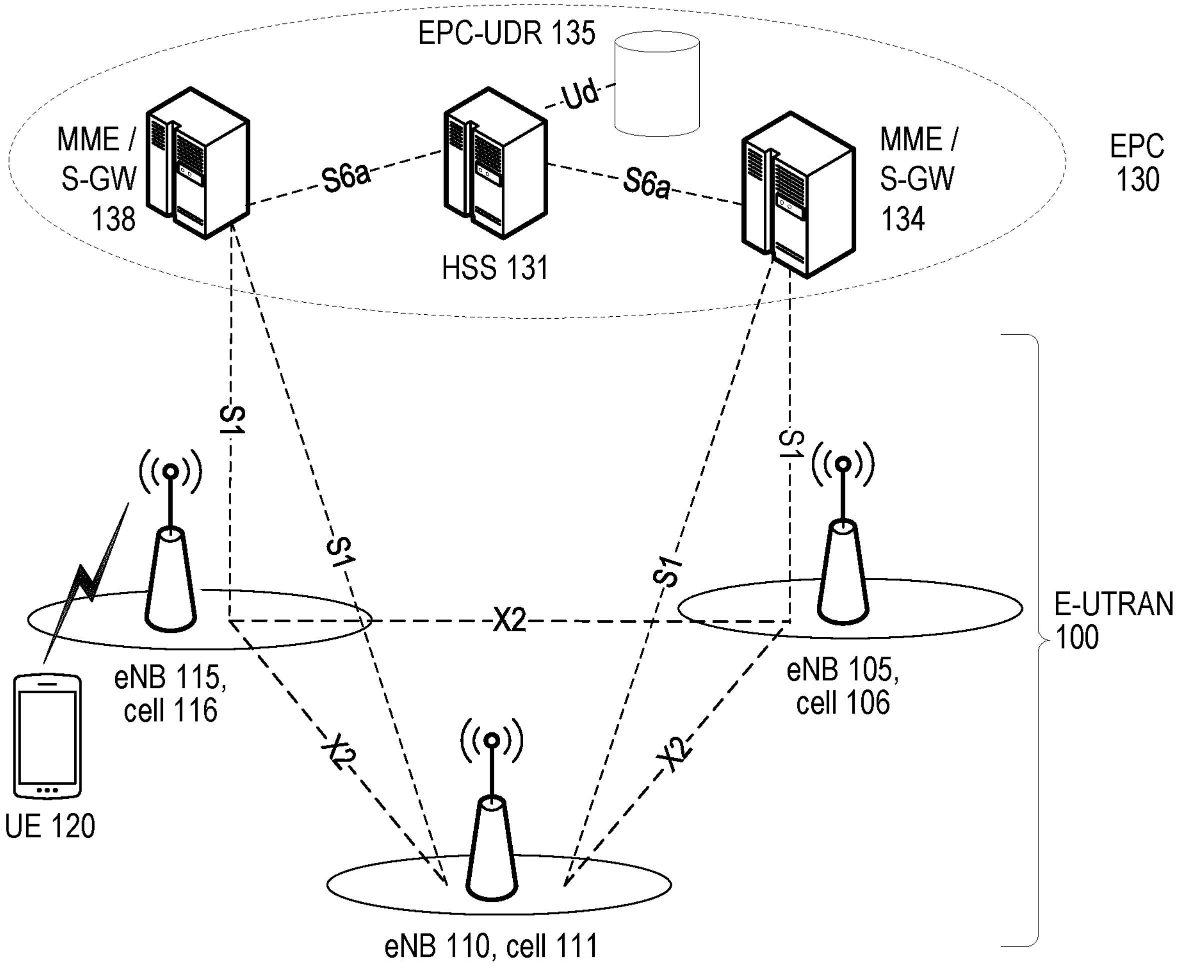
FIG. 1 shows a high-level view of an exemplary LTE network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IOT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

Figure 2:
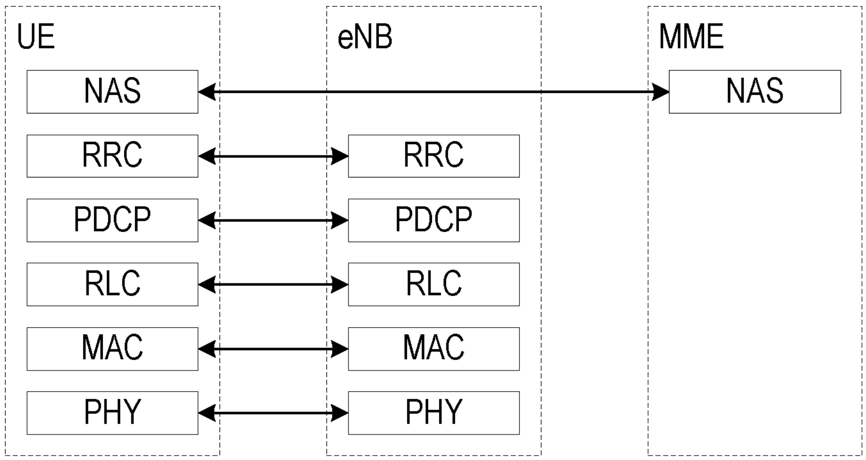
FIG. 2 is a block diagram of an exemplary LTE control plane (CP) protocol stack.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

As briefly mentioned above, LTE Rel-12 introduced dual connectivity (DC) whereby a UE can be configured with a Master Cell Group (MCG) provided by a master node (MN) and a Secondary Cell Group (SCG) provided by a secondary node (SN). Each of the CGs is a group of serving cells that includes one MAC entity, a set of logical channels with associated RLC entities, a primary cell (PCell), and optionally one or more secondary cells (SCells). The term "special cell" ("SpCell" for short) refers to the MCG PCell or the primary SCG cell (PSCell) depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. The SN provides additional radio resources (e.g., bearers) for certain bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Both MN and SN can terminate the user plane (UP) to the UE, which includes three different types of bearers. MCG bearers are terminated in the MN, and the S1-U connection for the corresponding bearer(s) to the S-GW is terminated in the MN. The SN is not involved in the transport of UP data for MCG bearers. Likewise, SCG bearers are terminated in the SN, which can be directly connected with the S-GW via S1-U. The MN is not involved in the transport of UP data for SCG bearers. Split bearers (and their corresponding S1-U connections to S-GW) are also MN-terminated with PDCP data transferred between MN and SN via X2-U.

Figure 3:
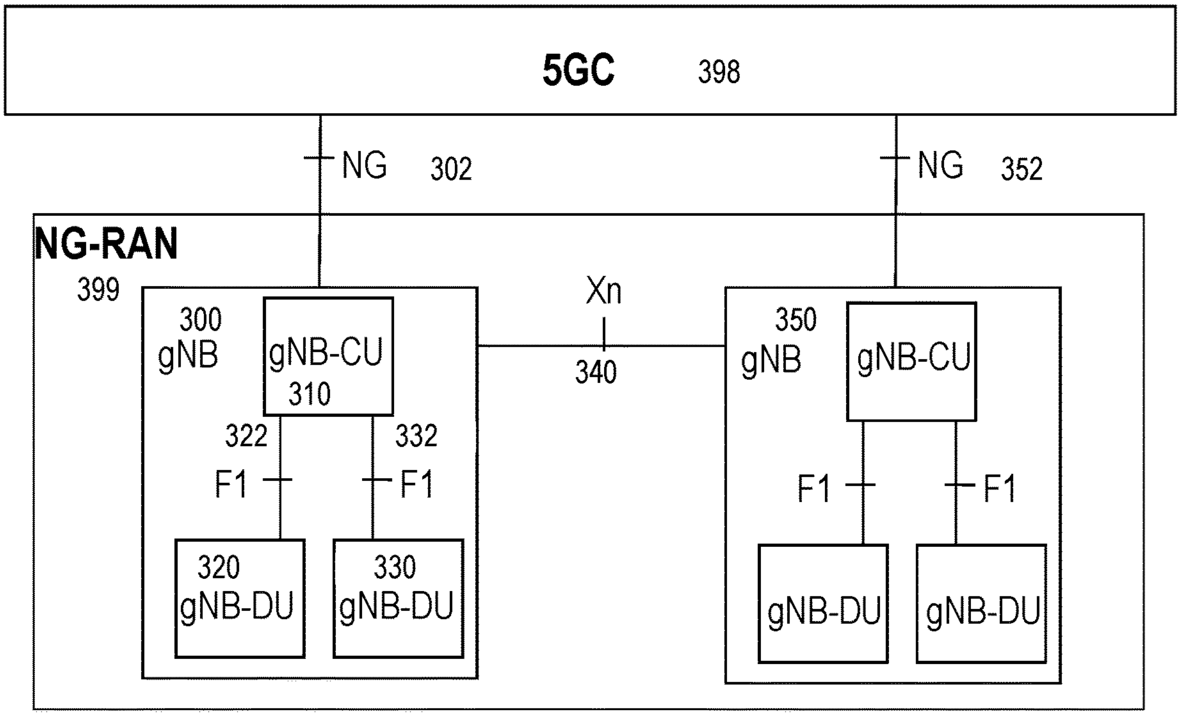
FIG. 3 shows a high-level view of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 3GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect to the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs are logical nodes that host higher-layer protocols and perform various gNB functions such controlling the operation of DUs. Each DU is a logical node that hosts lower-layer protocols and can include various subsets of the gNB functions. As such, each of the CUs and DUs can include various circuitry needed to perform their respective functions, including processing circuitry, transceiver circuitry (e.g., for communication), and power supply circuitry.

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by configuring a UE to connect to multiple DUs served by the same CU or by configuring a UE to connect to multiple DUs served by different CUs.

As briefly mentioned above, 5G/NR technology shares many similarities with 4G/LTE. For example, both PHYs utilize similar arrangements of time-domain physical resources into 1-ms subframes that include multiple slots of equal duration, with each slot including multiple OFDM-based symbols. As another example, the NR RRC layer includes RRC_IDLE and RRC_CONNECTED states like LTE, but adds another state known as RRC_INACTIVE.

In addition to providing coverage via "cells," as in LTE, NR networks also provide coverage via "beams." In general, a downlink (DL) "beam" is a coverage area of a network-transmitted RS that may be measured or monitored by a UE. For example, these RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

DC is also an important feature for 5G/NR networks. 3GPP TR 38.804 (v14.0.0) describes various exemplary DC scenarios or configurations in which the MN and SN can apply either NR RAT, LTE RAT, or both, and can connect to either EPC or 5GC. The following terminology is used to describe these exemplary DC scenarios or configurations:

- DC: LTE DC (i.e., both MN and SN employ LTE, as discussed above);
- EN-DC: LTE-NR DC where MN (eNB) employs LTE and SN (gNB) employs NR, and both are connected to EPC.
- NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.
- NE-DC: LTE-NR dual connectivity where a UE is connected to one gNB that acts as a MN and one ng-eNB that acts as a SN. The gNB is connected to 5GC and the ng-eNB is connected to the gNB via the Xn interface.
- NR-DC (or NR-NR DC): both MN and SN employ NR and connect to 5GC via NG.
- MR-DC (multi-RAT DC): a generalization of the Intra-E-UTRA Dual Connectivity (DC) described in 3GPP TS 36.300 (v16.0.0), where a multiple Rx/Tx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 4:
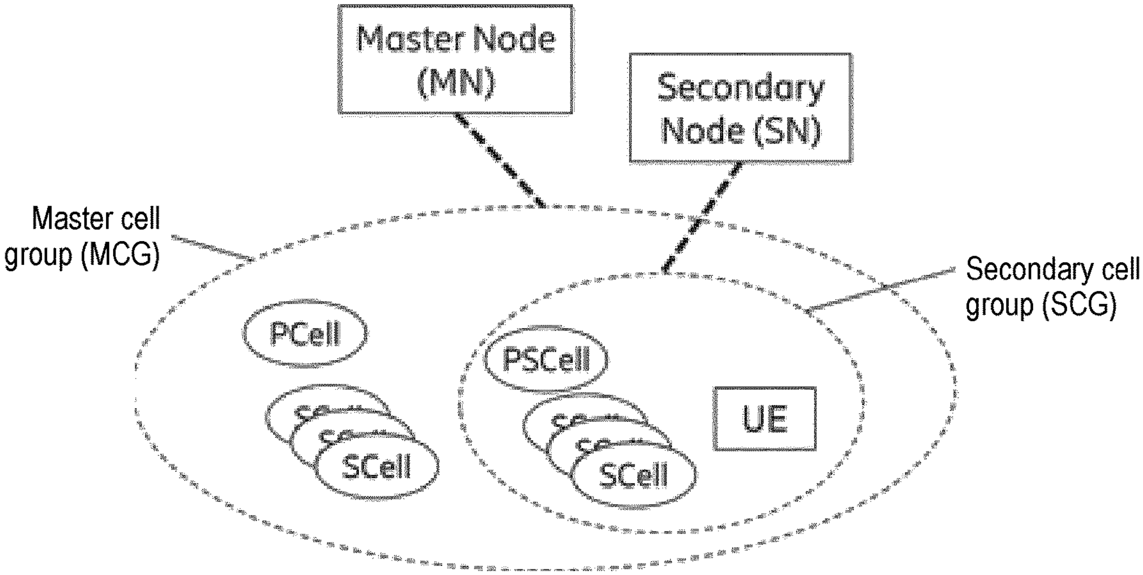
FIG. 4 shows a high-level view of dual connectivity (DC) in combination with carrier aggregation (CA).

FIG. 4 shows a high-level illustration of DC in combination with carrier aggregation. In this illustration, each of the MN and the SN can be either an eNB or a gNB, in accordance with the various DC scenarios mentioned above. The MN provides the MCG consisting of a PCell and three SCells arranged in CA, while the SN provides the SCG consisting of a PSCell and three SCells arranged in CA.

Figure 5:
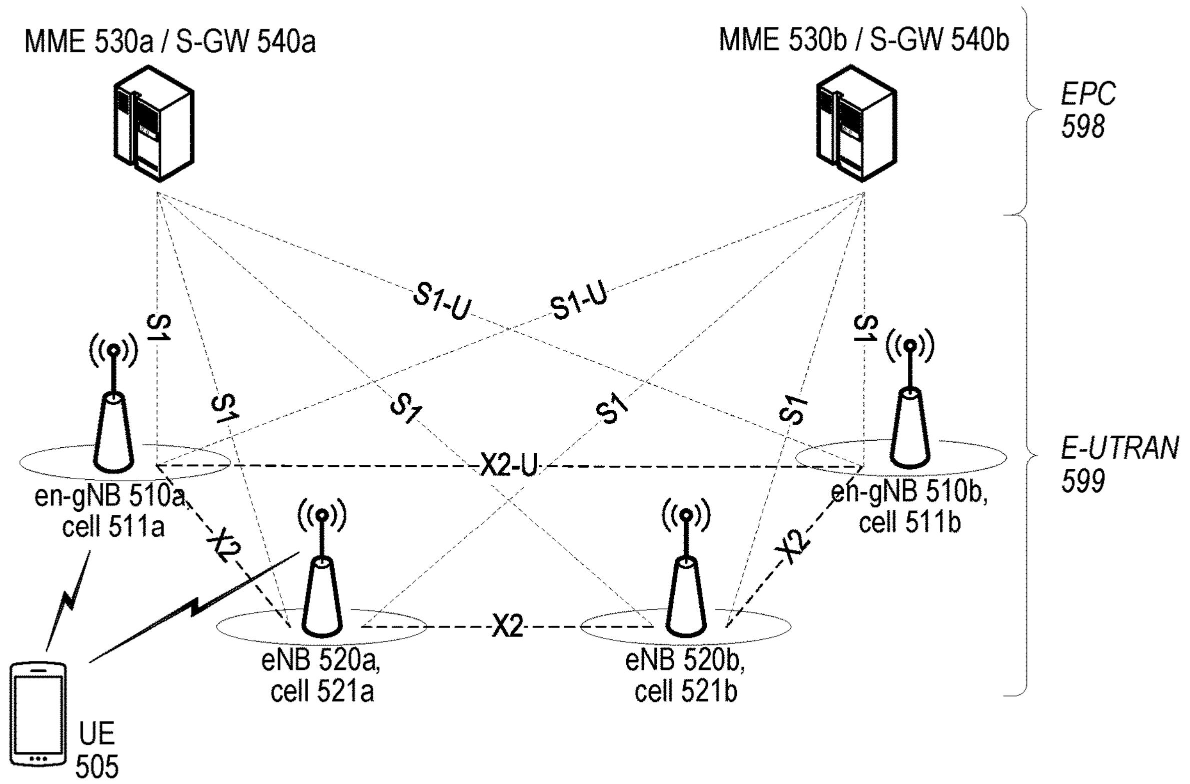
FIGS. 5-6 show high-level views of exemplary network architectures that support multi-RAT DC (MR-DC) using EPC and 5GC, respectively.

FIG. 5 shows a high-level view of an exemplary network architecture that supports EN-DC, including an E-UTRAN 599 and an EPC 598. As shown in the figure, E-UTRAN 599 can include en-gNBs (e.g., 510*a,b*) and eNBs (e.g., 520*a,b*) that are interconnected with each other via respective X2 (or X2-U) interfaces. The eNBs can be similar to those shown in FIG. 1, while the ng-eNBs can be similar to the gNBs shown in FIG. 3 except that they connect to EPC 598 via an S1-U interface rather than to a 5GC via an X2 interface. The eNBs also connect to EPC 598 via an S1 interface, similar to the arrangement shown in FIG. 1. More specifically, en-gNBs (e.g., 510*a,b*) and eNBs (e.g., 520*a,b*) connect to MMEs (e.g., 530*a,b*) and S-GWs (e.g., S-540*a,b*) in the EPC.

Each of the en-gNBs and eNBs can serve a geographic coverage area including one more cells, including cells 511*a-b* and 521*a-b* shown as exemplary in FIG. 5. Depending on the cell in which it is located, a UE 505 can communicate with the en-gNB or eNB serving that cell via the NR or LTE radio interface, respectively. In addition, UE 505 can be in EN-DC with a first cell served by an eNB and a second cell served by an en-gNB, such as cells 520*a* and 510*a* shown in FIG. 5.

Figure 6:
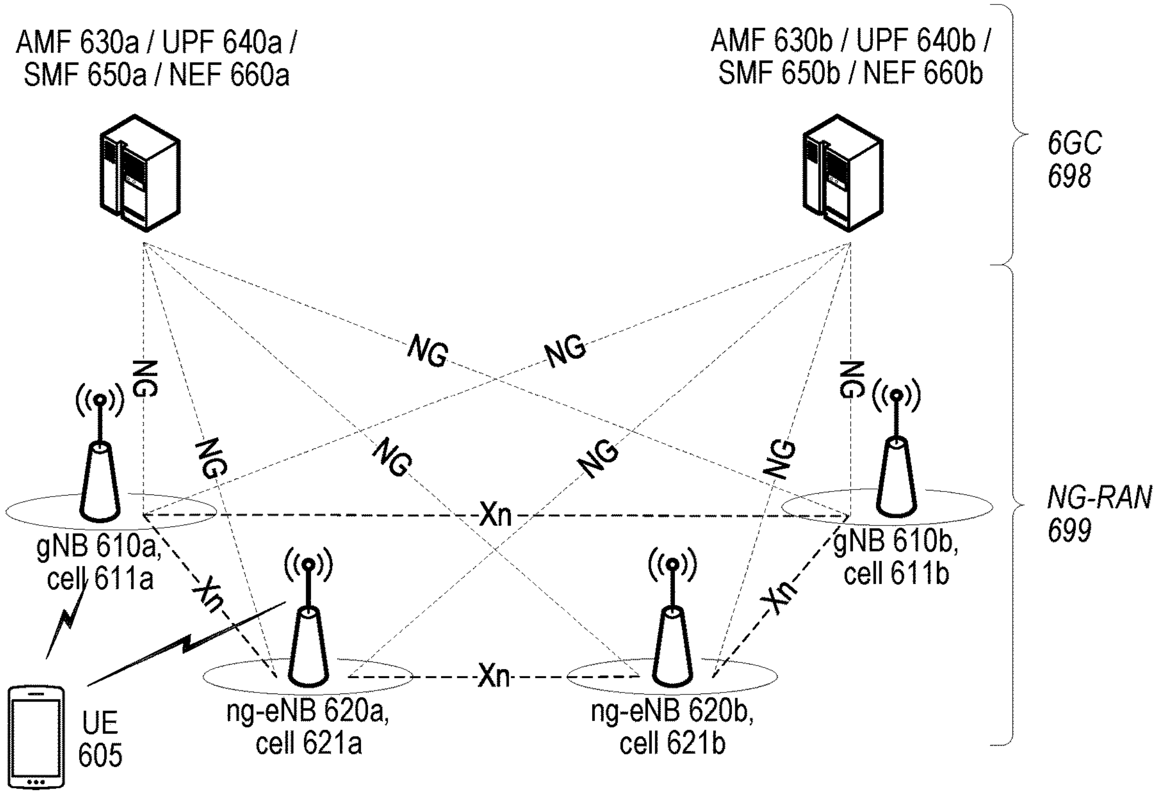

FIG. 6 shows a high-level view of an exemplary network architecture that supports MR-DC configurations based on a 5GC. More specifically, FIG. 6 shows an NG-RAN 699 and a 5GC 698. NG-RAN 699 can include gNBs (e.g., 610*a,b*) and ng-eNBs (e.g., 620*a,b*) that are interconnected with each other via respective Xn interfaces. The gNBs and ng-eNBs are also connected via the NG interfaces to 6GC 698, more specifically to the access and mobility management functions (AMFs, e.g., 630*a,b*) via respective NG-C interfaces and to the user plane functions (UPFs, e.g., 640*a,b*) via respective NG-U interfaces. Moreover, the AMFs can communicate with one or more session management functions (SMFs, e.g., 650*a,b*) and network exposure functions (NEFs, e.g., 660*a,b*).

Each of the gNBs 610 can be similar to those shown in FIG. 5, while each of the ng-eNBs can be similar to the eNBs shown in FIG. 1 except that they connect to 5GC 598 via an NG interface rather than to EPC via an S1 interface. Each of the gNBs and ng-eNBs can serve a geographic coverage area including one more cells, including cells 611*a-b* and 621*a-b* shown as exemplary in FIG. 6. The gNBs and ng-eNBs can also use various directional beams to provide coverage in the respective cells. Depending on the cell in which it is located, a UE 605 can communicate with the gNB or ng-eNB serving that cell via the NR or LTE radio interface, respectively. In addition, UE 605 can be in MR-DC connectivity with a first cell served by an ng-eNB and a second cell served by a gNB, such as cells 620*a* and 610*a* shown in FIG. 6.

Figure 7:
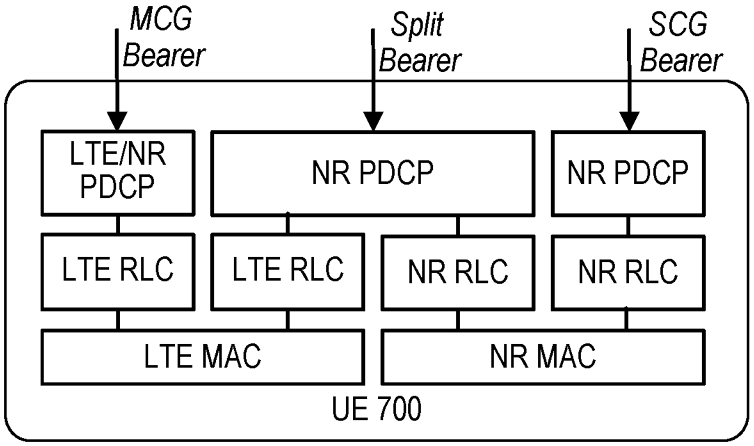
FIGS. 7-8 show user plane (UP) radio protocol architectures from a UE perspective for EN-DC with EPC and MR-DC with 5GC, respectively.
Figure 8:
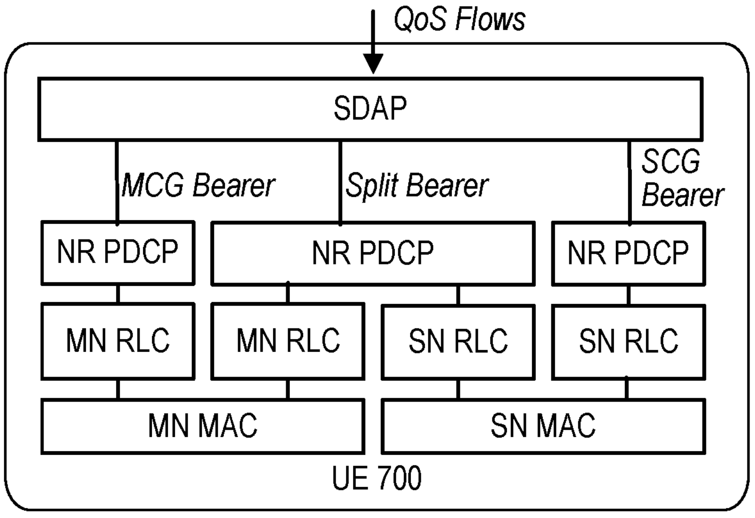

FIGS. 7-8 show UP radio protocol architectures from a UE perspective for MR-DC with EPC (e.g., EN-DC) and with 5GC (e.g., NGEN-DC, NE-DC, and NR-DC), respectively. In both cases, a UE (700) supports MCG, SCG, and split bearers, as discussed above. In the EN-DC arrangement shown in FIG. 7, MCG bearers have either LTE (e.g., E-UTRA) or NR PDCP and LTE RLC and MAC layers, while SCG bearers have NR PDCP, RLC, and MAC layers. Split 20) bearers have NR PDCP layer and both LTE and NR RLC and MAC layers. In the arrangement shown in FIG. 8, all bearers have NR PDCP layers and lower layers corresponding to the RAT used by the MN and SN. One difference between the architectures in FIGS. 7-8 is that the various bearers for MR-DC with 5GC are associated with QoS flows that are terminated in an SDAP layer above PDCP.

Figure 9:
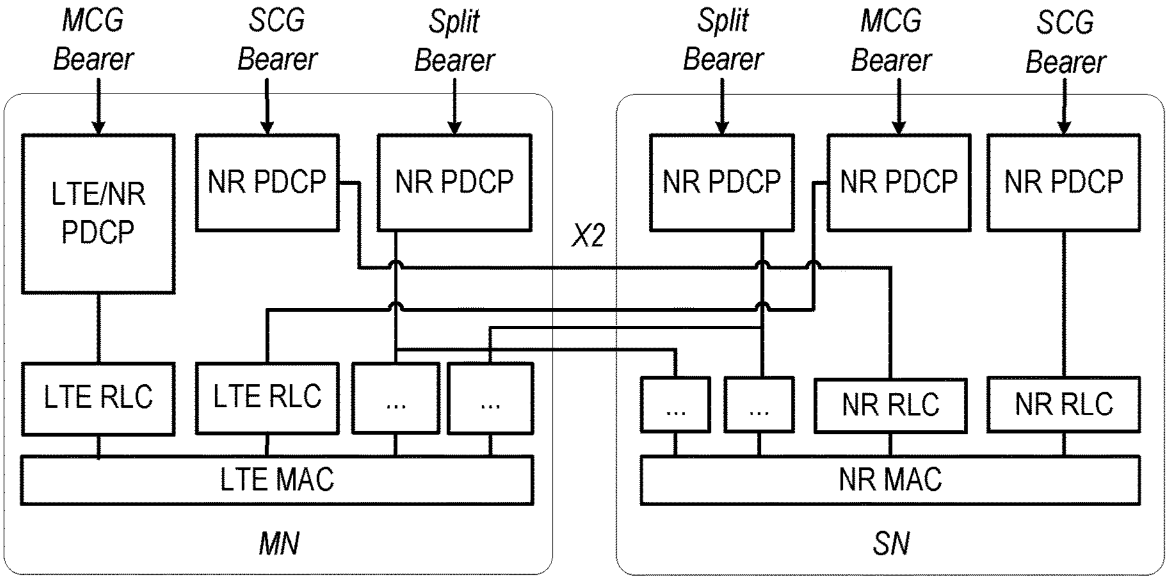
FIGS. 9-10 show UP radio protocol architectures from a network perspective for EN-DC with EPC and MR-DC with 5GC, respectively.
Figure 10:
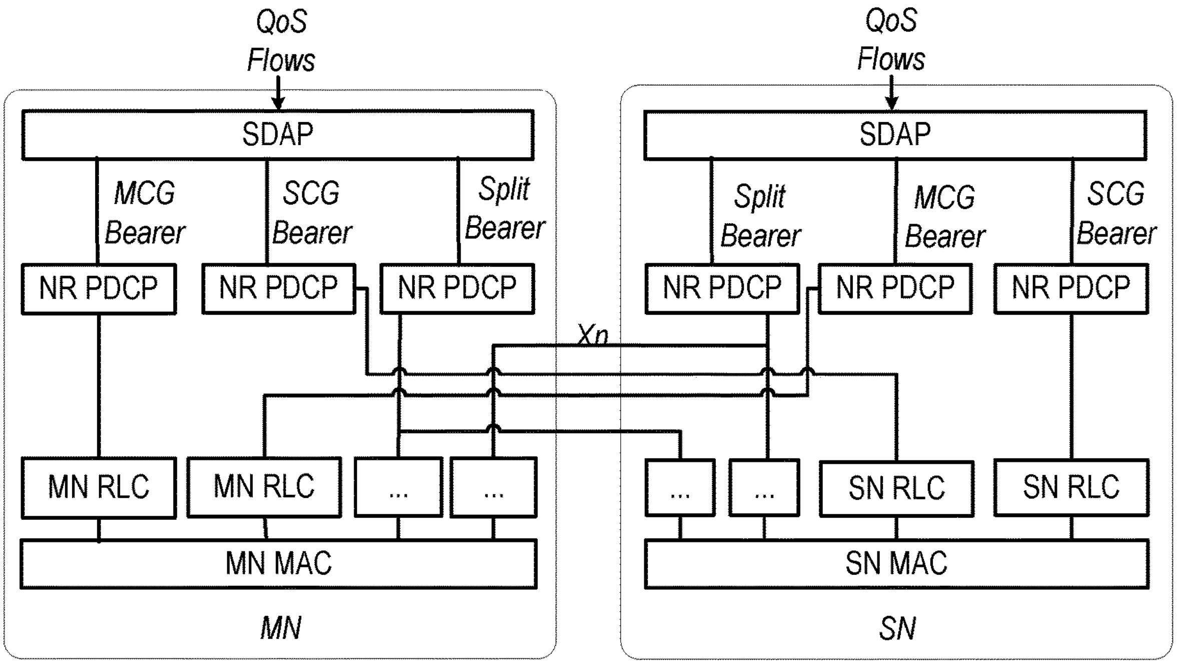

FIGS. 9-10 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 9, an MCG bearer terminated in MN has PDCP layer of the RAT used by the MN, while all other bearers have NR PDCP layer. All bearers have lower layers associated with the RAT of the node(s) in which they are terminated. In the arrangement shown in FIG. 10, all bearers have NR PDCP layers and lower layers associated with the RAT of the node(s) in which they are terminated. From a network perspective, each MCG, SCG, and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 9-10 is that the various bearers for MR-DC with 5GC are associated with QoS flows that are terminated.

FIGS. 9-10 also have some DC-specific variations. In EN-DC with EPC, the network can configure either E-UTRA PDCP or NR PDCP for MN terminated MCG data radio bearers (DRBs) while NR PDCP is always used for all other DRBs. In MR-DC with 5GC, NR PDCP is always used for all DRB types. In NGEN-DC, E-UTRA RLC/MAC is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

Figure 11:
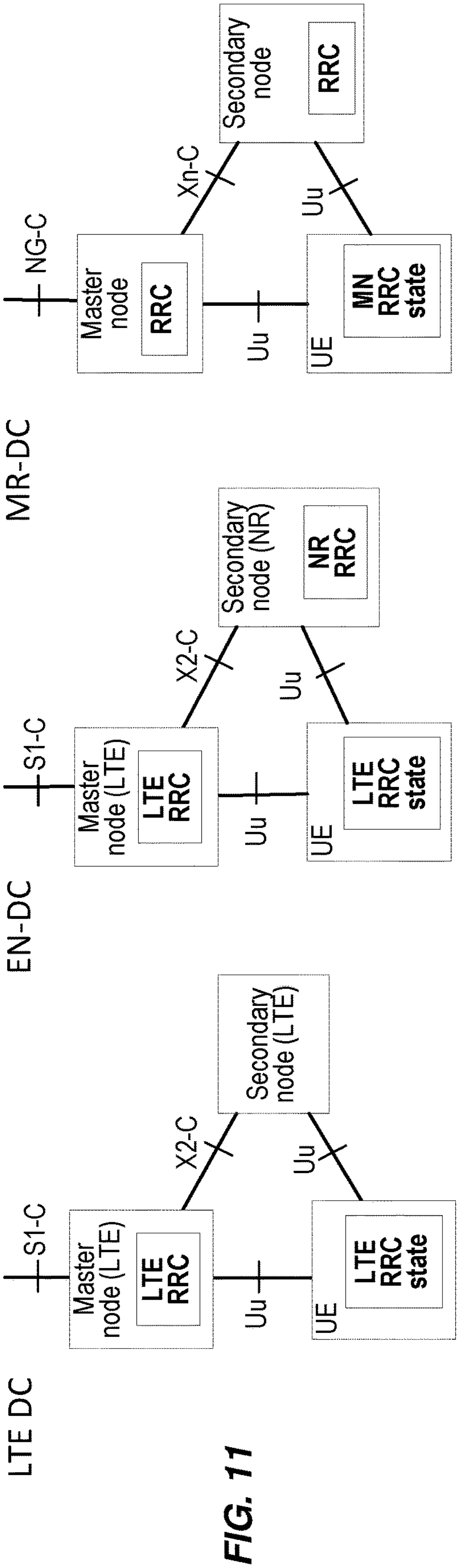
FIG. 11 is a block diagram showing a high-level comparison of control plane (CP) architectures in LTE DC, EN-DC, and MR-DC using a 5G core network (5GC).

FIG. 11 is a block diagram showing a high-level comparison of CP architectures in LTE DC, EN-DC, and MR-DC using a 5G core network (5GC). One primary difference is that in EN-DC and NR-DC, the SN has a separate NR RRC entity. This means that the SN can also control the UE, sometimes without the knowledge of the MN but often the SN needs to coordinate with the MN. In LTE-DC, the RRC decisions are always made by the MN (MN to UE). Even so, the LTE-DC SN still decides the configuration of the SN, since it is only the SN itself that has knowledge of what kind of resources, capabilities etc. it has.

Another difference between LTE-DC and the others is the use of a split bearer for RRC. Split RRC messages are mainly used for creating diversity, and the sender can decide to either choose one of the links for scheduling the RRC messages, or it can duplicate the message over both links. In the DL, the path switching between the MCG or SCG legs (or duplication on both) is left to network implementation. On the other hand, for the UL, the network configures the UE to use the MCG, SCG, or both for RRC messages. The terms "leg", "path" and "RLC bearer" are used interchangeably throughout this document.

A UE receives bearer configurations in the radioBearerConfig IE that can be included in a RRCReconfiguration message. If a UE is configured with MR-DC, it will have two radio bearer configurations, one associated with the MCG (for MN terminated bearers) and one associated with the SCG (for SN terminated bearers). Each bearer has an associated PDCP configuration, and for split bearers, there is a field in the PDCP-Config IE that specifies the primary path to be used for UL data transmission, i.e., MCG or SCG). There is also a field ul-DataSplitThreshold included in the moreThanOneRLC IE. If the UL buffer at the UE corresponding to that split bearer is below this threshold, the UE will only do the buffer status reporting (BSR) and/or send UL scheduling requests (SR) to the node hosting the primary path. For example, if primary path is MCG, the UE will send BSR and SR via MCG MAC to MN. If the UL buffer exceeds the threshold, the UE can send the BSR and SR to both the MN and SN and transmit UL data in the cell group(s) in which it receives an UL grant.

Packet duplication (also referred to as "PDCP duplication" or "PDCP PDU duplication") can increase reliability and reduce latency, which can be very beneficial for ultra-reliable low latency (URLLC) data services. When PDCP duplication is configured for a radio bearer by RRC, an additional RLC entity and an additional logical channel are added to the radio bearer to handle the duplicated PDCP protocol data units (PDUs). As such, PDCP duplication involves sending the same PDCP PDUs twice: once on the original (or primary) RLC entity and a second time on the additional (or secondary) RLC entity.

Note that the primary RLC entity is associated with a primary logical channel (LCH) and the secondary RLC entity is associated with a secondary LCH. When configuring duplication for a DRB, RRC also sets the state of PDCP duplication (i.e., activated or deactivated) at the time of (re-)configuration. After the configuration, the PDCP duplication state can then be dynamically controlled by a MAC CE. In DC, the UE applies these MAC CE commands regardless of whether they were received via MCG or SCG.

As mentioned above, 3GPP Rel-17 includes a work item for efficient SCG/SCell activation/deactivation for UEs in MR-DC. This can be especially important for MR-DC configurations with NR SCG since it has been found that, in some cases, NR UE energy consumption is three-to-four times higher than in LTE. 3GPP previously specified the concepts of dormant LTE SCell and dormancy-like behavior of an NR SCell. In LTE, when an SCell is in dormant state, the UE does not need to monitor the corresponding PDCCH or PDSCH and cannot transmit in the corresponding UL. This behavior is similar to behavior in a deactivated state, but the UE is also required to perform and report CQI measurements, which is different from deactivated state behavior. A PUCCH SCell (SCell configured with PUCCH) cannot be in dormant state.

Figure 12:
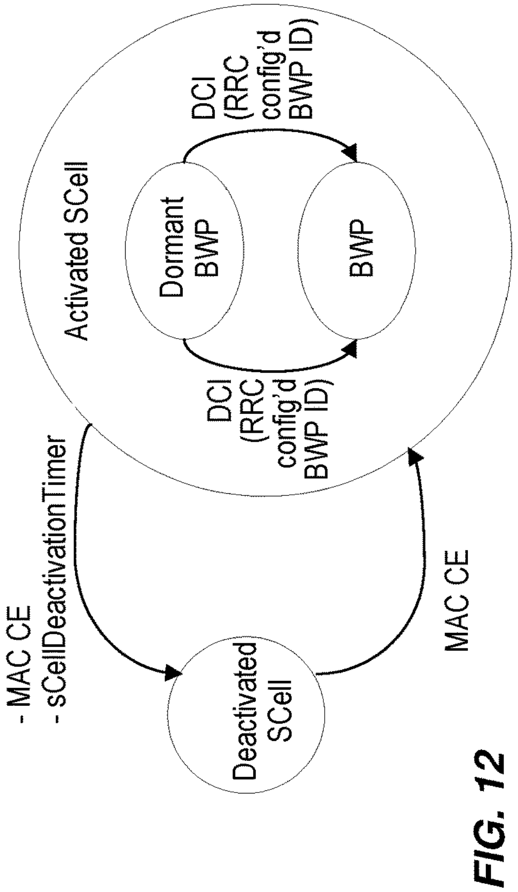
FIG. 12 shows an exemplary state transition diagram for NR secondary cells (SCells).

FIG. 12 shows an exemplary state transition diagram for NR SCells. At a high level, a UE's SCell can transition between deactivated and activated states based on explicit commands from the network (e.g., MAC CEs) or expiration of a deactivation timer. Dormancy-like behavior for deactivated NR SCells is based on the concept of dormant bandwidth parts (BWP). One of the UE's dedicated BWPs configured via RRC signaling can be configured as dormant for an SCell. If the active BWP of the activated SCell is a dormant BWP, the UE stops monitoring PDCCH on the SCell but continues performing CSI measurements, AGC, and beam management (if configured to do so). Downlink control information (DCI) on PDCCH is used to control entering/leaving the dormant BWP for SCell(s) or SCG(s) and is sent to the SpCell of the cell group that includes the dormant SCell (i.e., to PCell if SCell belongs to MCG, to PSCell if SCell belongs to SCG). The SpCell (i.e., PCell or PSCell) and PUCCH SCell cannot be configured with a dormant BWP.

However, if the UE is configured with MR-DC, it cannot fully benefit from the energy reductions of dormant state or dormancy-like behavior since the PSCell cannot be configured to be dormant. Instead, an existing solution could be releasing (for power savings) and adding (when traffic demands requires) the SCG on an as-needed basis. Traffic is likely to be bursty, however, so adding and releasing the SCG as needed can involve a significant amount of RRC signaling and inter-node messaging between the MN and the SN. This can experience considerable delay.

In relation to 3GPP Rel-16, there were some discussions about placing the PSCell in dormancy, also referred to as SCG Suspension. Some agreed principles of this solution include:

- The UE supports network-controlled suspension of the SCG in RRC_CONNECTED.
- UE behavior for a suspended SCG is for further study (FFS).
- The UE supports at most one SCG configuration, suspended or not suspended, in Rel16.
- In RRC_CONNECTED upon addition of the SCG, the SCG can be either suspended or not suspended by configuration.

More detailed solutions were proposed for Rel-16, but these have various problems. For example, one solution proposed that a gNB can indicate for a UE to suspend SCG transmissions when no data traffic is expected to be sent in SCG, so that UE keeps the SCG configuration but does not use it for power saving purposes. Signaling to suspend SCG could be based on DCI/MAC-CE/RRC, but no details were discussed above the particular configuration from the gNB to the UE. Even so, this solution for SCells may not be applicable to PSCells, which may be associated with a different network node (e.g., a gNB operating as SN).

Figure 13:
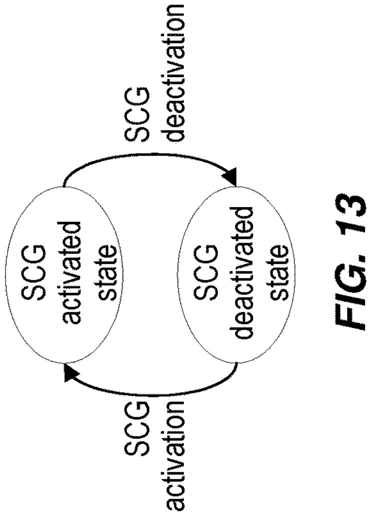
FIG. 13 is an exemplary secondary cell group (SCG) state transition diagram.

3GPP discussions on solutions for the Rel-17 MR-DC work item objective "Support efficient activation/de-activation mechanism for one SCG and SCells" have started in RAN1, RAN2, and RAN3 WGs. The concept of a "deactivated SCG" for reducing energy consumption when the traffic demands are dynamically reduced is being discussed. FIG. 13 is an exemplary state transition diagram illustrating two SCG states (sometimes referred to as "states for SCG 25 activation") according to this concept. In FIG. 13, these states are labelled "SCG deactivated state" and "SCG activated state" and are distinct from RRC states. Rather, these SCG states represent whether or not an SCG energy saving mode has been applied.

Current RAN2 assumption is that in "SCG deactivated state", the UE does not perform PDCCH monitoring of the PSCell in order to reduce energy consumption. This also means UL/DL data transmission in the SCG is suspended in SCG deactivated state. Activation and deactivation of the SCG is typically controlled by the network (e.g., by MN via RRC signaling). Moreover, RAN2 has agreed that PSCell mobility is supported while the SCG is deactivated, even if details are FFS. When the UE is configured with an SCG in "SCG activated state", these energy-reduction features are not used/applied.

The following agreements have been reached in 3GPP regarding the Rel-17 work item mentioned above:

- Network-triggered SCG activation is indicated to the UE via the MCG.
- Network-triggered SCG deactivation can be indicated to the UE via the MCG. Indication via SCG is FFS.
- SCG activation can be requested by MN/SN/UE. FFS on how to accept/reject the procedure. FFS which signaling is used.
- SCG deactivation can be requested by MN/SN. FFS whether UE can request deactivation. FFS on how to accept/reject the procedure. FFS which signaling is used.
- Indication of SCG deactivation to the UE via the SCG is not supported.
- The UE can indicate to the MN that the UE would like the SCG to be deactivated. FFS on the details such as reusing UE assistance information (UAI) or existing messages, information included, etc. Network can configure whether UE is allowed to do the indication.

The MAC layer in the network includes dynamic resource schedulers that allocate DL and UL PHY resources. UL scheduling is based on a UE transmitting scheduling requests (SRs) and measurement reports including buffer status reports (BSRs) and power headroom reports (PHRs). More details about NR UL scheduling are given in 3GPP TS 38.300 and 38.321.

The network schedules UL data transmissions in a cell by dynamically or semi-statically allocating radio resources to UEs. These radio resources are provided to the UE in dynamic UL grants via PDCCH or in a Random Access Response (RAR), or as configured (i.e., persistent) UL grants via RRC signaling (optionally with grant activation/deactivation by DCI). An UL grant includes a resource allocation (e.g., in time/frequency) for transmission and other instructions on how to transmit the data on PUSCH.

UL BSRs (or more simply, BSRs) are needed for QoS-aware packet scheduling. In NR, BSRs indicate data volume buffered in the UE for each logical channel group (LCG). Relative to SRs, BSRs speed up scheduling by informing the network of the amount of UL data the UE has pending. Based on the received BSRs, the network may then provide UL grants to accommodate transmission of all data in the UE buffer without having to wait for further UE SRs. When a BSR is triggered (e.g., by arrival of new UL data) and no resources are available to transmit the BSR, the UE can transmit a SR to obtain an UL grant for the BSR. If the UE has no valid PUCCH resources to transmit the SR (e.g., due to expiration of time alignment timer), the UE initiates random access to establish UL synchronization and receive the UL grant needed for the BSR.

In NR, the RRC layer configures the following parameters to control UE BSRs:

- periodicBSR-Timer, per MAC entity configuration in BSR-Config (effectively optional);
- retxBSR-Timer, per MAC entity configuration in BSR-Config (mandatory);
- logicalChannelSR-DelayTimer Applied, per logical channel configuration (optional);
- logicalChannelSR-DelayTimer, per MAC entity configuration in BSR-Config;
- logicalChannelSR-Mask, per logical channel configuration;
- logicalChannelGroup, per logical channel configuration (optional).

Each logical channel (LCH) may be allocated to an LCG using the logicalChannelGroup. The maximum number of LCGs is eight. The MAC entity determines the amount of UL data available for a logical channel according to the data volume calculation procedure specified in 3GPP TS 38.322 and 38.323.

In general, the following conditions can trigger a UE BSR:

1. Data arrives for a logical channel which belongs to a LCG and if
   - no data is available on any of the logical channels belonging to any other LCG's or
   - data is available only for the logical channels belonging to the lower priority LCG.
2. Upon retxBSR-Timer expiry and UE has data available for transmission for any of the logical channels which belong to an LCG.
3. Number of padding bits after UL grant is allocated is equal to or larger than the size of the Buffer Status Report MAC CE and its subheader.
4. Upon expiration of periodicBSR-Timer.

A BSR triggered in the conditions 1-2 is referred as Regular BSR, a BSR triggered by condition 3 is referred as Padding BSR, and a BSR triggered by condition 4 is referred as Periodic BSR. Buffer status reporting is performed by the UE MAC layer using different types of MAC CEs, including the following:

- Short BSR format (fixed size);
- Long BSR format (variable size);
- Short Truncated BSR format (fixed size); or
- Long Truncated BSR format (variable size).

FIG. 14A shows an exemplary MAC CE according to the Short BSR and Short Truncated BSR formats, while FIG. 14B shows an exemplary MAC CE according to the Long BSR and Long Truncated BSR formats. The BSR formats are identified by MAC sub-headers with Logical Channel Identifiers (LCIDs). In NR, the LCID 59 indicates Short Truncated BSR, LCID 60 indicates Long Truncated BSR, LCID 61 indicates Short BSR, and LCID 62 indicates Long BSR Fields shown in FIGS. 14A-B are defined as follows:

- LCG ID: The Logical Channel Group ID field identifies the group of logical channel(s) whose buffer status is being reported. The length of the field is 3 bits;
- $LCG_i$: For the Long BSR format and Pre-emptive BSR format, the $LCG_i$ field set to 1 indicates that the Buffer Size field for the logical channel group i is reported while being set to 0 indicates that the Buffer Size field for the logical channel group i is not reported. For Long Truncated BSR format, the $LCG_i$ field set to 1 indicates that logical channel group i has data available while being set to 0 indicates that logical channel group i does not have data available;
- Buffer Size i: The Buffer Size field identifies the total amount of data across all logical channels of logical channel group i after the MAC PDU has been built (i.e., after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits.

Whenever a new transmission is performed, the MAC entity applies the Logical Channel Prioritization (LCP) procedure to decide from which LCH to multiplex data (and how much data) in this new transmission. In principle, the MAC entity prioritizes the logical channel according to the LCP and up to a prioritized bit rate. The MAC entity prioritizes those logical channels whose prioritized bit rate are not met over those logical channels whose prioritized bit rate are met. Within each of these two groups, the prioritization is based on the logical channel priority. This mechanism is achieved via a parameter Bj and is discussed in more detail in 3GPP TS 38.321 (v16.5.0) section 5.4.3.1.

The procedure for UE BSR reporting is further defined in 3GPP TS 38.321 (v16.2.0) section 5.4.5. Additionally, UE BSR reporting is configured via RRC using the BSR-Config IE. In particular, BSR-Config is included in a MAC-CellGroupConfig IE, which is included in a CellGroupConfig IE. The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells). The MAC-CellGroupConfig IE is used to configure MAC parameters for a cell group, including DRX. FIGS. 15A-C show ASN.1 data structures for exemplary (CellGroupConfig, MAC-CellGroupConfig, and BSR-Config IEs, respectively.

The value of the buffer size field reported for an LCG in a BSR is determined by summing results of data volume calculations for each LCH of the LCG. Furthermore, the MAC entity performs the following actions when various reconfigurations of the MAC entity is requested by upper layers (i.e., by an RR(Reconfiguration message that includes a mac-(CellGroupConfig IE):

- initialize the corresponding HARQ entity upon addition of an SCell;
- remove the corresponding HARQ entity upon removal of an SCell;
- apply the new value for timers when the timer is (re) started;
- apply the new maximum parameter value when counters are initialized;
- apply immediately the configurations received from upper layers for other parameters.

This is used to reconfigure new parameters (e.g., timers) and add SCells.

Furthermore, the MAC entity performs the following actions when a reset of the MAC entity is requested by upper layers:

- initialize Bj for each logical channel to zero;
- initialize SBj for each logical channel to zero if Sidelink resource allocation mode 1 is configured by RRC;
- stop (if running) all timers;
- consider all timeAlignmentTimers as expired and perform the corresponding actions in clause 5.2;
- set the NDIs for all uplink HARQ processes to the value 0;
- sets the NDIs for all HARQ process IDs to the value 0 for monitoring PDCCH in Sidelink resource allocation mode 1;
- stop, if any, ongoing Random-Access procedure;
- discard explicitly signalled contention-free Random-Access Resources for 4-step RA type and 2-step RA type, if any;
- flush Msg3 buffer;
- flush MSGA buffer;
- cancel, if any, triggered Scheduling Request procedure;
- cancel, if any, triggered Buffer Status Reporting procedure;
- cancel, if any, triggered Power Headroom Reporting procedure;
- cancel, if any, triggered consistent LBT failure;
- cancel, if any, triggered BFR;
- cancel, if any, triggered Sidelink Buffer Status Reporting procedure;
- cancel, if any, triggered Pre-emptive Buffer Status Reporting procedure;
- cancel, if any, triggered Recommended bit rate query procedure;
- cancel, if any, triggered Configured uplink grant confirmation;
- cancel, if any, triggered configured sidelink grant confirmation;
- cancel, if any, triggered Desired Guard Symbol query;
- flush the soft buffers for all DL HARQ processes;
- for each DL HARQ process, consider the next received transmission for a TB as the very first transmission;
- release, if any, Temporary C-RNTI;
- reset all BFI_COUNTERS;
- reset all LBT_COUNTERs.

The MAC reset procedure is used to cancel relevant ongoing procedures and reset all UE internal states and counters. It can be applied in various scenarios, including but not limited to the following:

- during handover, in which the UE reset the MAC entity for the source, before creating a MAC entity for target;
- timer T300 expires;
- upper layers abort the RRC connection establishment procedure, while the UE has not yet entered RRC_CONNECTED;
- SCG is released;
- timer T304 expires (reconfiguration with sync failure);
- upon going to RRC_IDLE; and
- MCG or SCG failure.

In general, the existing MAC reset procedure gives the MAC entity a "clean slate", e.g., to set up another MAC entity for a target during handover. In contrast, MAC reconfiguration applies new parameters from the network to the MAC entity, which is kept running. However, neither procedure is suitable for SCG in the deactivated state. The general understanding in 3GPP is that UL/DL data transmission in the SCG is suspended when the SCG is in deactivated state. However, there has been no discussion of how UE UP processes and procedures are affected by SCG deactivated state, including processes and procedures performed by UE MAC entity(ies).

On one hand, some MAC entity procedures should be stopped/canceled so that the UE can reduce SCG-related energy consumption. On the other hand, some other MAC entity procedures should not be stopped/canceled so that the UE can quickly re-active the SCG when needed. Furthermore, UE actions upon re-activating the SCG are unclear. Since MAC reset/reconfiguration actions are applied only once, but it is unclear whether those are applied when SCG is de-activated or when SCG is re-activated later.

In some scenarios, in the SCG de-activated state, UE uses buffer status reporting functionality at the MAC entity of the SCG side so that the uplink data arrival at the SCG side can trigger a request for SCG re-activation. However, the BSR mechanism as defined in the MAC spec does not work in the SCG de-activated state, since the MAC entity is not activated and the necessary recovery mechanisms for BSR are not in-place (e.g., relevant timers are not running). For example, if a BSR procedure is cancelled upon receiving an SCG de-activation command (i.e., BSR is not sent), the UE does not trigger another BSR even if there is more data coming in the same LCH.

In another example, if the MAC entity is reset only upon MAC entity resume, some ongoing procedures upon MAC entity suspend (e.g., SR due to BFR, consistent LBT failure, etc.) would trigger unnecessary SR and random access to indicate the need for SCG re-activation. In another example, if the MAC entity is reset only upon MAC entity suspend, some MAC parameters are not reset to the correct state or value (e.g., Bj value for the logical channel and the periodic PHR).

Accordingly, embodiments of the present disclosure provide novel, flexible, and efficient techniques whereby ongoing MAC procedures (i.e., when the MAC entity is in a normal operating state) are divided into first, second, and third parts. When the MAC entity is suspended, the procedures in the first part are reset. When the MAC entity is resumed, the procedures in the third part are reset. Additionally, the procedures in the second part remain active (e.g., are kept ongoing) during the period between suspension and resume.

To summarize, when a UE's MAC entity is suspended, the UE cancels most ongoing MAC procedures, except the following ongoing procedures are not cancelled and/or remain ongoing:

- buffer status reporting (BSR) procedures;

scheduling request (SR) procedures that are triggered by a BSR, i.e., for data volume reporting; and random-access procedures due to transmission of a pending BSR.

When the UE's MAC entity is suspended, the UE performs one of the following:

monitors the data traffic arrival with the BSR mechanisms and considers logicalChannelSR-DelayTimer to have a value of 0 and/or logicalChannelSR-Delay Timer Applied to be false;

enables BSR triggering based on data volume of some logical channels configured by RRC, with such BSR triggering only being valid when the MAC entity is suspended; or triggers SR based on data volume of some logical channels configured by RRC.

When the UE's MAC entity is resumed, the UE performs one or more of the following operations:

reset prioritization parameter Bj for each logical channel to zero;

considers all logical channels that belongs to an LCG to include no available UL data just before MAC entity resumed;

resumes any type-1 UL configured grants (CG) from the network;

triggers a PHR; and initiates a random process on the PCell.

Embodiments can provide various benefits, advantages, and/or solutions to problems described herein. For example, embodiments facilitate suspension and resumption of a MAC entity to support SCG deactivation and reactivation and its corresponding reduction in UE energy consumption, such as by allowing a UE to trigger a BSR procedure and/or a data volume report in a fast and reliable way. In this manner, the network can be quickly informed about a UE's need for reactivation of a deactivated SCG (e.g., due to UL traffic arrival), which can reduce and/or minimize transmission latency of UL data.

In the following discussion, the terms "suspended SCG", "deactivated SCG", "inactive SCG", and "SCG in reduced-energy mode" are used interchangeably. From the UE perspective, however, "SCG in reduced-energy mode" means that the UE is operating in a reduced-energy mode with respect to the SCG. Likewise, the terms "resumed SCG", "activated SCG", "active SCG", "SCG in normal energy mode", "normal SCG operation", and "legacy SCG operation" are used interchangeably. From the UE perspective, "SCG in normal energy mode" means that the UE is operating in a normal (i.e., non-reduced) energy mode with respect to the SCG. Examples of operations are UE signal reception/transmission procedures e.g., RRM measurements, reception of signals, transmission of signals, measurement configuration, measurement reporting, evaluation of triggered event measurement reports, etc.

In the following, embodiments are described in terms of an SCG that is suspended for a UE configured with DC. However, similar principles can be applied to an MCG that is suspended for a UE configured with DC.

In the following, the terms "buffer status report" and "BSR" refer to an indication from a UE to a network about available UL data volume at the UE. This includes a BSR transmitted via a MAC CE based on a UL grant received from the network. This also includes the case when there is no UL grant for the transmission of the BSR, such that a UE must obtain an UL grant by transmitting an SR on a valid PUCCH resource or by initiating a random-access procedure without a valid PUCCH resource.

In the following, the terms "buffer status report" and "BSR" are used generically to encompass all species of BSR, including Short BSR, Short Truncated BSR, Long BSR, and Long Truncated BSR. For example, if more than one LCG has UL data available for transmission when a MAC PDU containing the BSR is built in the SCG MAC, the UE can transmit a Long BSR for all LCGs that have available UL data. Otherwise, if only one LCG has UL data available, the UE can transmit a Short BSR reporting the available UL data volume for that LCG. Further selection of regular or truncated formats can also be performed.

In general, there is one and only one MAC entity for an SCG. If the SCG is de-activated, then the associated MAC entity is suspended (which may alternately be referred to as deactivated) until the SCG is re-activated, at which time the associated MAC entity is resumed (which may alternately be referred to as deactivated).

The following description refers to an SCG MAC entity being suspended and resumed. The MAC suspend/resume may also be used in cases other than deactivated SCG, including but not limiting to the following:

During a "make-before-break handover", the MCG MAC entity is suspended (rather than reset) and then resumed after the UE associating with the target PCell.

For multiple RAT multiple connectivity (MR-MC), one or more SCGs could be de-activated such that their respective MAC entities could be suspended and later resumed.

The following describes various operations performed by a MAC entity (hosted by a UE) upon being suspended or being resumed. The order in which these operations are described does not necessarily correspond to the order in which these operations are performed, unless expressly stated otherwise or implicitly required by the surrounding context. In other words, the operations can be performed in various orders.

Figure 16:
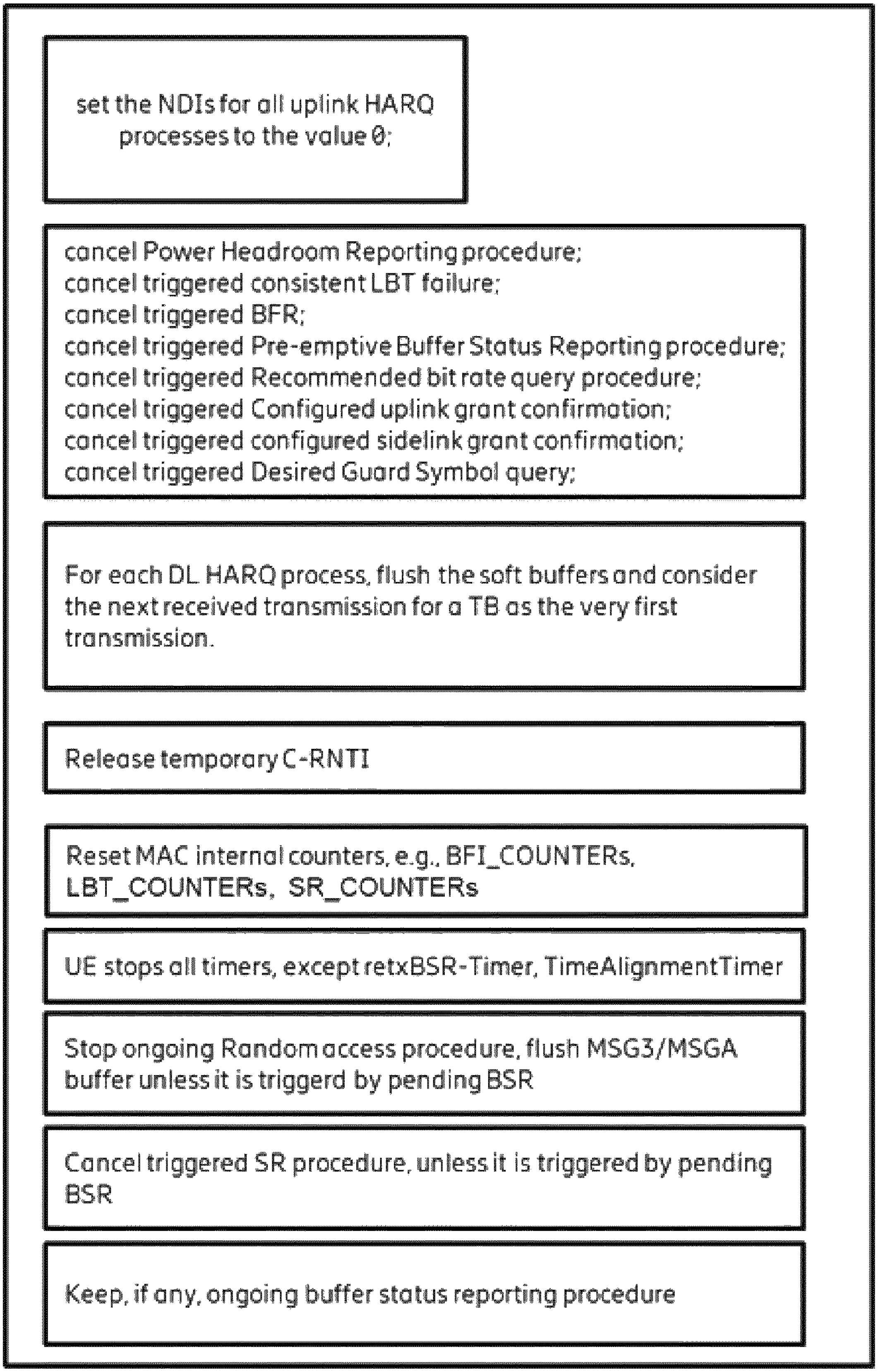
FIG. 16 shows an overview of operations performed by the UE upon suspension of a MAC entity, according to various embodiments of the present disclosure.

FIG. 16 shows an overview of operations performed by the UE upon suspension of the MAC entity. These operations are described in more detail below.

In some embodiments, upon suspension of the MAC entity, the UE set the new data indicators (NDIs) for all UL HARQ processes to a value of zero (0). This ensures that after the MAC entity is resumed, the UE and the network are aligned on the NDI value used to indicate whether the UL grant is a new transmission or a retransmission. For example, a wrong NDI value result in the UE needing a re-transmission but the network intending to schedule an initial transmission. In one alternative, the UE sets the NDIs for all uplink HARQ processes to zero when the MAC entity is resumed.

In some embodiments, upon suspension of the MAC entity, the UE cancels any of the following procedures that have been triggered (i.e., are ongoing):

PHR;

consistent LBT failure recovery;

beam failure recovery (BFR);

pre-emptive BSR;

recommended bit rate query;

UL CG confirmation;

sidelink (SL) CG confirmation; and

Desired Guard Symbol (DSG) query.

In some embodiments, upon suspension of the MAC entity, the UE flushes the soft buffers for the DL HARQ processes and considers the next received transmission for a TB as the very first transmission. This ensures that after the MAC entity is resumed, the UE and the network are aligned on whether to schedule an initial transmission or a retransmission for a DL HARQ process. In one alternative, the UE flushes the soft buffers for each DL HARQ process when the MAC entity is resumed.

In some embodiments, the UE performs the following operations upon suspension of the MAC entity:

release any temporary C-RNTIs;
reset all BFI_COUNTERS;
reset all LBT_COUNTERs; and
reset all SR COUNTERS.

In some embodiments, the UE performs the following operations upon suspension of the MAC entity:

stop any ongoing Random Access (RA) procedure;
flush Msg3 buffer;
flush MSGA buffer; and
cancel any triggered SR procedure.

In a variant, the UE performs the following operations upon suspension of the MAC entity except when an ongoing RA procedure is caused by a pending BSR:

stop any ongoing RA procedure;
flush Msg3 buffer;
flush MSGA buffer;

A RA procedure can be triggered, for example, by beam failure recovery or the lack of valid PUCCH resource for transmitting SR that is triggered by an LBT failure MAC CE. It may not make sense to keep a RA procedure running if the RA procedure is triggered by those events, since the network is unable to recover anything after receiving this indication and may not know the reason for the UE's RA. On the other hand, if the RA procedure is triggered due to a pending BSR, then the network should know this as soon as possible. Even though these procedures may also be triggered later in SCG de-activated state, this may cause an unacceptable delay.

In another variant, upon suspension of the MAC entity, the UE cancels any triggered SR procedure except for SR triggered by the BSR that is triggered by a logical channel. For example, the UE can cancel SR procedures triggered by SCell BFR or consistent LBT failure recovery. It may not make sense to maintain SR procedures for these failure recoveries, since the network is unable to recover anything after receiving this indication. On the other hand, if an SR procedure is triggered due to a pending BSR, then the network should know this as soon as possible. Even though these procedures may also be triggered later in SCG de-activated state, this may cause an unacceptable delay.

In some embodiments, upon suspension of the MAC entity, the UE maintains (or keeps) any ongoing BSR procedures. This is in contrast to the MAC entity reset procedure, in which any triggered BSR procedure is cancelled.

In general, BSR is triggered when the UE has data to transmit but has no suitable UL grant to do so. However, there can be a race condition in which the network is not yet aware that the UE has data to transmit when it very recently sent a SCG-deactivation command. For example, the network may deactivate the SCG at approximately the same time as data to transmit in the SCG arrives UE buffers. By maintaining the BSR procedure upon suspension of the MAC entity (i.e., due to SCG deactivation), the UE is able to indicate the need for SCG activation as soon as possible. If a BSR procedure is cancelled upon receiving an SCG de-activation command such that a BSR is not sent, there is a risk that the BSR procedure is never triggered later when more data arrives in the LCH that triggered the BSR procedure. This can occur under existing BFR procedures discussed above. Maintaining ongoing BSR procedures upon suspension can avoid this problem.

The race condition described above due to the UE being unable to reject an SCG de-activation command from the network. In a variant, when the UE receives an SCG de-activation command from the network at approximately when BSR reporting is triggered by arriving UL data, the UE can reject the SCG de-activation command. This also avoids the race condition.

In some embodiments, upon suspension of the MAC entity, the UE stops all running timers and/or considers all running timers as expired, except as specified below for particular embodiments:

The retxBSR-Timer is kept running so that the UE can trigger a regular BSR, the only type that can subsequently trigger a scheduling request/random access.

At least the timeAlignmentTimer associated with PCell timing advance group (PTAG) is kept running, so that the UE can transmit SR on the PSCell if this timer has not expired. In other words, the UE considers only the timeAlignmentTimer associated with any STAG to be expired or the UE considers none of the timeAlignmentTimers to be expired.

In some embodiments, upon suspension of the MAC entity, the UE perform the following operations on any cells having an associated timeAlignmentTimer that is not expired:

clear any configured DL assignments and UL CGs; and
clear any PUSCH resource for semi-persistent CSI reporting.

In a variant, upon suspension of the MAC entity, then the UE suspends only type-1 UL CGs in any cells having an associated timeAlignmentTimer that is not expired.

In some embodiments, upon suspension of the MAC entity, the UE notifies the RRC layer to release PUCCH resources for all serving cells whose time Alignment Timer is not expired, except PUCCH resources for SR. In a variant, the UE notifies the RRC layer to release PUCCH resources for all such serving cells, except the PSCell. In this manner, the UE can maintain PUCCH resources on the PSCell, which eliminates the need for the network to monitor other serving cells for UE SR transmissions.

Operations performed by the UE while the MAC entity is suspended will now be described in more detail. Embodiments are described as first, second, and third alternatives, although these numbers do not indicate any particular preference among the three alternatives.

The first alternative will now be described. In some embodiments, while the MAC entity is suspended, the UE can only trigger a BSR procedure. This procedure would subsequently trigger a SR if there is no UL-SCH in the SCG MAC entity. If there is no valid PUCCH resource configured for the pending SR, a RA procedure on the SpCell is triggered.

In a variant, while the MAC entity is suspended, a regular BSR can be triggered in the de-activated MAC entity with logicalChannelSR-DelayTimer configured to a value of zero, or with logicalChannelSR-DelayTimerApplied configured as "false", regardless of how these parameters were previously configured by RRC. In this manner, there is no delay for the UE to trigger an SR while the SCG is in a de-activated state.

The second alternative will now be described. In some embodiments, while the MAC entity is suspended, a regular BSR can only be triggered if the data volume of particular LCHs is non-zero. This triggering mechanism only applies when the MAC entity is in the suspended mode. The data volume is computed in the PDCP layer, as described in 3GPP TS 38.323 (v16.2.0) clause 5.6.

As one example, only data volumes for LCHs other than a split secondary RLC entity are considered for triggering a BSR. For those split secondary RLC entities, they only need to be activated if the total amount of PDCP data volume and RLC data volume pending for initial transmission is larger than ul-DataSplitThreshold, but the same data volume can also be indicated to the MCG MAC entity and so there is no need to trigger a data volume report for these RLC entities.

As another example, only data volumes for LCHs that belong to an LCG are considered for triggering a BSR. The field logicalChannelGroup is an optional field in configuration of a logical channel, such that logical channels that do not belong to any logical channel group are assumed to have non-delay-critical data with no need to trigger a data volume report when the SCG is deactivated.

As another example, the particular LCHs that can trigger a data volume report when the SCG is deactivated can be RRC-configured by the network. In general, these configured LCHs should have more stringent latency requirements than other LCHs that are not configured in this manner.

As another example, only LCHs other than LCH UL-CCCH can trigger a data volume report when the SCG is deactivated.

The third alternative will now be described. In some embodiments, while the MAC entity is suspended, the UE cannot trigger any procedures except monitoring data volume of some particular LCH(s). If the monitored data volume is non-zero, then the UE triggers a SR but under the condition that there is no UL-SCH resource. In a variant, the SR is triggered only when it was not previously triggered before, i.e., only a single one of these SRs is triggered at the MAC entity.

Rather than being associated with any LCH, this SR can be associated with a separate SR configuration in the RRC IE MAC-CellGroupConfig, such as a schedulingRequestId. The following shows an exemplary ASN.1 data structure for the MAC-CellGroupConfig IE, in which this field has been added.

```
*** Begin exemplary ASN.1 data structure ***
MAC-CellGroupConfig ::= SEQUENCE {
    [...]
    schedulingRequestID-PCellActivate SchedulingRequestId
    OPTIONAL, -- Need R
}
*** End exemplary ASN.1 data structure ***
```

Once this SR is triggered it becomes pending. The pending SR is canceled and the corresponding sr-ProhibitTimer (when running) is stopped, when any of the following is true:

- UL-SCH sources are allocated by the network in this MAC entity, e.g., by detecting a correct PDCCH in the PSCell that contains an UL grant;
- the MAC entity is resumed, e.g., receiving a RRC message from MCG to activate the SCG; and/or
- the MAC entity has no valid PUCCH resource configured for the pending SR and in which case, a RA procedure is triggered.

In some embodiments, the UE is configured with a set of PUCCH resources to transmit the SR on a BWP and this set of PUCCH resources is always considered as valid, even if the SCG is de-activated.

The data volume is computed in the PDCP layer, as further described in 3GPP TS 38.323 (v16.2.0) section 5.6. In one variant, only data for LCHs other than the split secondary RLC entity can trigger a data volume report. In another variant, only LCHs that belong to an LCG can trigger a data volume report. In another variant, the LCHs that can trigger the data volume report for a deactivated SCG are configured by the network (e.g., via RRC). In another variant, only LCH other than LCH UL-CCCH are considered.

In a variation of the third alternative, the MAC entity stops all ongoing procedures when suspended and is reset according to current procedures. While the MAC entity is suspended, the UE monitors the data volume and triggers SR according to any of the techniques discussed above. When the MAC entity is resumed, the MAC entity is reset again according to current procedures.

Figure 17:
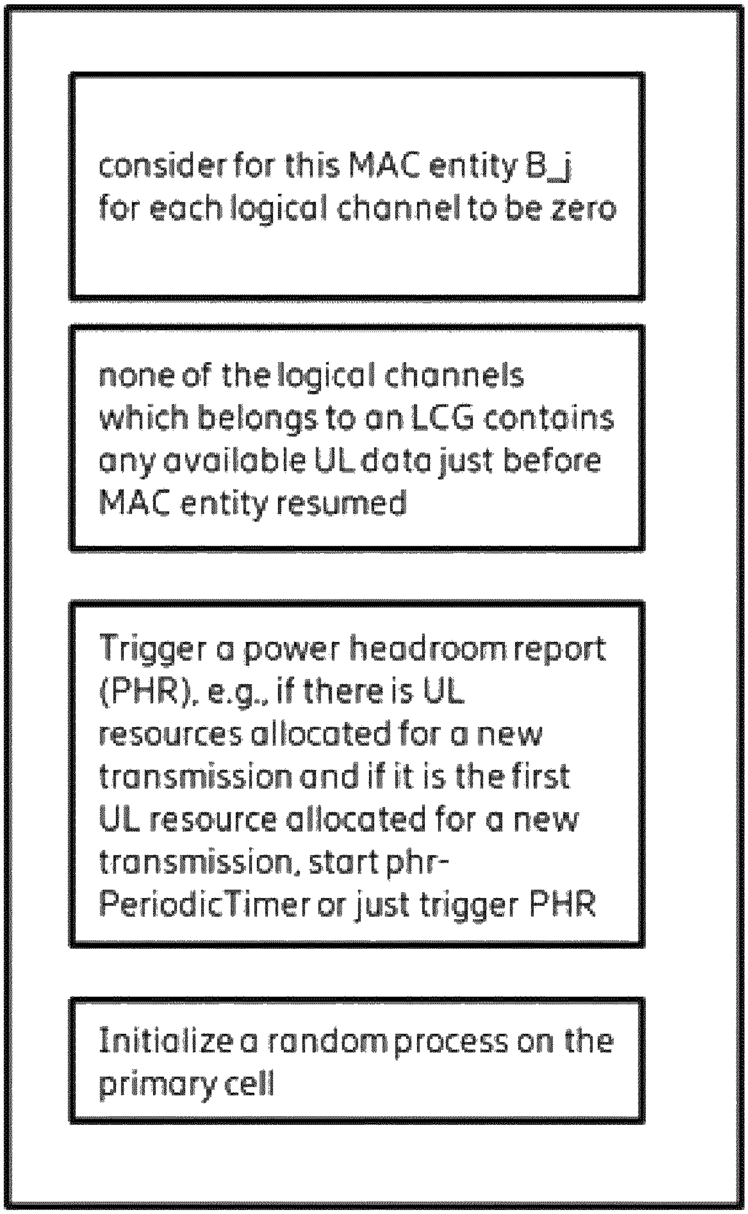
FIG. 17 shows an overview of operations performed by the UE upon resuming a MAC entity, according to various embodiments of the present disclosure.

FIG. 17 shows an overview of operations performed by the UE upon resuming the MAC entity. These operations are described in more detail below.

In various embodiments, the MAC entity is considered to be resumed upon occurrence any of the following events, either individually or in combination:

- triggering a BSR procedure in the SCG, such as by sending a BSR;
- sending an acknowledgement to a network command to activate the SCG;
- initiating an SR procedure in the SCG, such as by sending an SR; and/or
- initiating a RA procedure in the SCG, such as by sending a RA message (e.g., msg1).

In some embodiments, when the MAC entity is resumed, the UE resets prioritization parameter Bj to be zero (e.g., an initial value) for each logical channel of the resumed MAC entity. If not set to zero at the resume, then the Bj computation would have to consider the last time the Bj is updated which might be long before the SCG is de-activated and thus neither accurate nor useful. 3GPP TS 38.321 (v16.5.0) section 5.4.3.1 mandates that UE increment Bj by (PBR×T) before every instance of the LCP procedure, where T is the time elapsed since Bj was last incremented. In a variation, the UE also resets the corresponding sidelink SBj for each logical channel to zero if Sidelink resource allocation mode 1 has been RRC-configured.

In some embodiments, the UE considers that none of the logical channels that belong to an LCG contains any available UL data upon resuming the MAC entity when the SCG has been reactivated. This ensures that legacy BSR procedures can be resumed.

In some embodiments, when the MAC entity is resumed, the UE initiate a RA procedure on the PSCell.

In some embodiments, when the MAC entity is resumed, the UE can reinitialize any suspended type-1 UL CGs, according to their stored configurations, for the cells with an associated timeAlignmentTimer that is still running (i.e., neither expired nor stopped). These type-1 UL CGs can be reinitialized to start in respective symbols according to rules in 3GPP TS 38.321 section 5.8.2.2.

In some embodiments, when the MAC entity is resumed, the UE start phr-Periodic Timer when: 1) the MAC entity has UL resources allocated for a new transmission; and 2) it is the first UL resource allocated for a new transmission. Otherwise, the network will not get a PHR according to the configured by phr-PeriodicTimer, since this periodic timer was stopped. In a variant, a PHR is triggered when the MAC entity is resumed (i.e., at least the PSCell is resumed).

Figure 18:
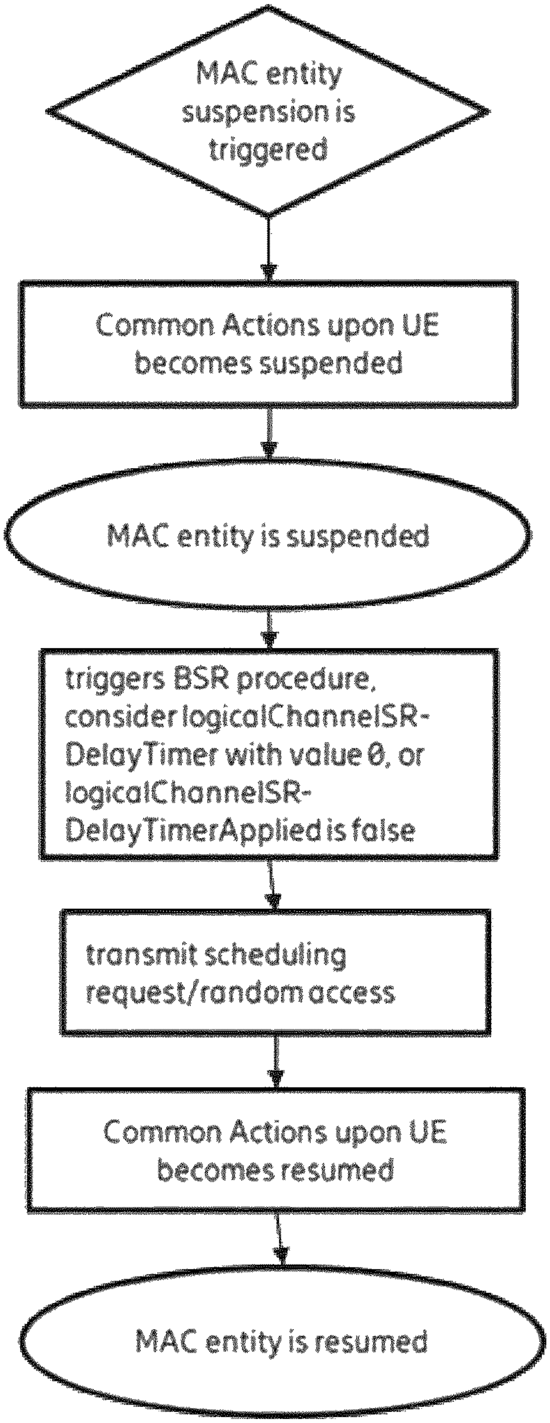
FIGS. 18-19 show high-level illustrations of UE operations upon suspension, during suspension, and upon resuming a MAC entity, according to various embodiments of the present disclosure.

FIG. 18 shows a high-level illustration of UE operations upon suspension, during suspension, and upon resuming a MAC entity, particularly for the first alternative discussed above in which the UE can trigger a BSR procedure during suspension of the MAC entity.

Figure 19:
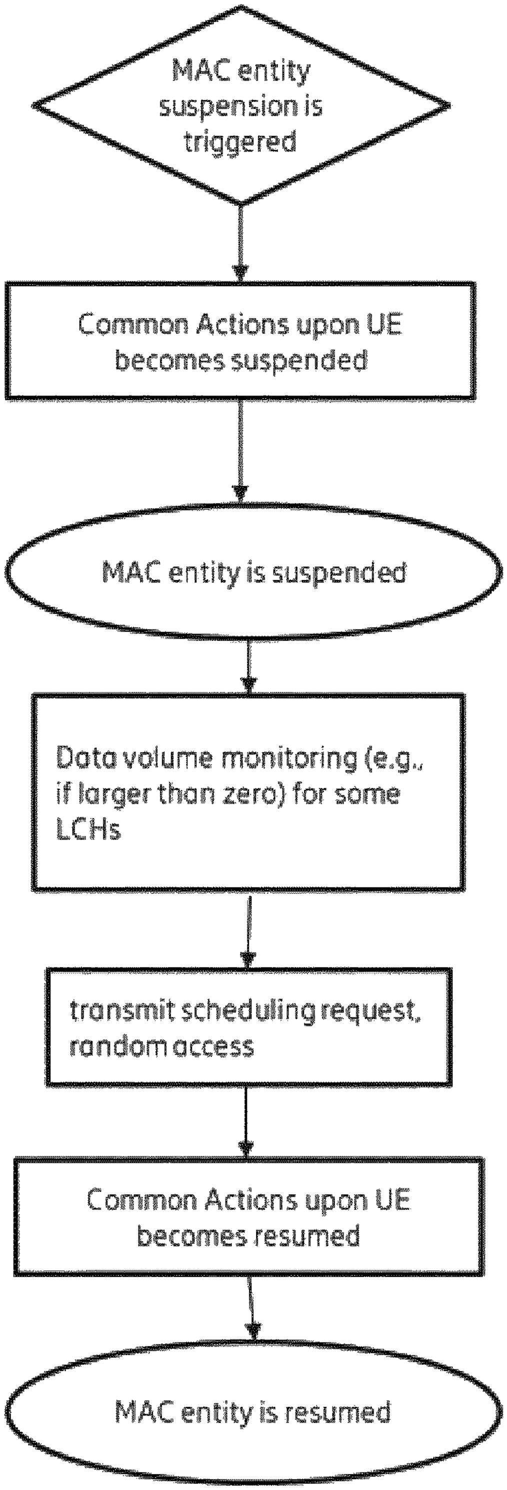

FIG. 19 shows another high-level illustration of UE operations upon suspension, during suspension, and upon resuming a MAC entity, particularly for the third alternative discussed above in which a UE can trigger SR during suspension of the MAC entity based on monitoring data volume of particular LCH(s).

Figure 20A:
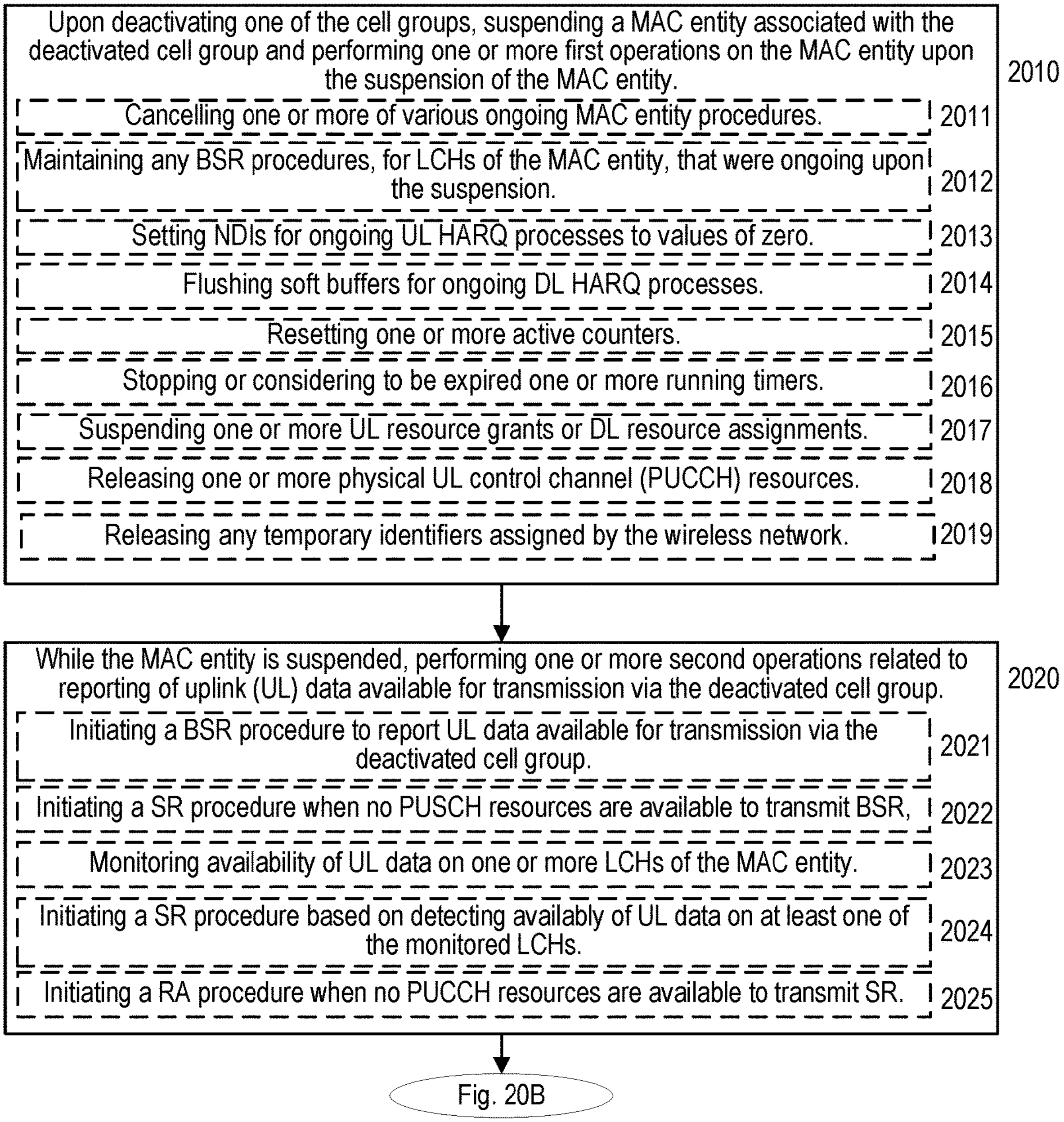
FIG. 20A-B is a flow diagram of an exemplary method (e.g., procedure) for a UE, according to various embodiments of the present disclosure.
Figure 20B:
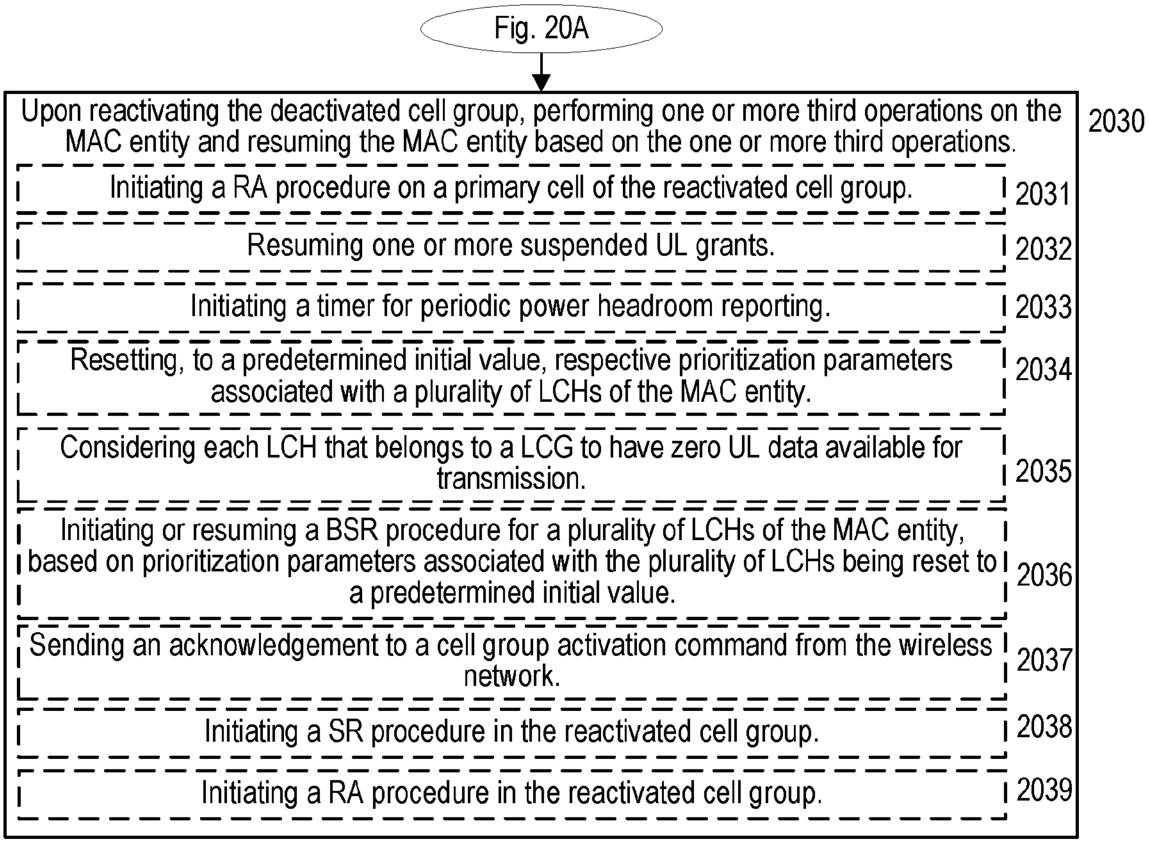

The embodiments described above can be further illustrated with reference to FIG. 20 (with parts A-B), which shows a flow diagram of an exemplary method (e.g., procedure) for a UE configured to communicate with a wireless network via an MCG and an SCG, according to various embodiments of the present disclosure. The exemplary method can be performed by a UE (e.g., wireless device, IoT device, modem, etc. or component thereof) such as described elsewhere herein. Although FIG. 20 shows specific blocks in a particular order, the operations of the method can be performed in different orders than shown and can be combined and/or divided into blocks having different functionality than shown. Optional blocks or operations are indicated by dashed lines.

The exemplary method can include operations of block 2010, where the UE can, upon deactivating one of the plurality of cell groups, suspend a MAC entity associated with the deactivated cell group and perform one or more first operations on the MAC entity upon the suspension of the MAC entity. The exemplary method can also include operations of block 2020, where the UE can, while the MAC entity is suspended, perform one or more second operations related to reporting of UL data available for transmission via the deactivated cell group. The exemplary method can also include operations of block 2030, where the UE can, upon reactivating the deactivated cell group, perform one or more third operations on the MAC entity and resume the MAC entity based on the one or more third operations.

For example, the plurality of cell groups include an MCG and an SCG, where the SCG is the cell group being deactivated and reactivated.

In some embodiments, performing the first operations on the MAC entity upon the suspension in block 2010 includes the operations of sub-block 2011, where the UE can cancel one or more of the following MAC entity procedures that were ongoing:

random access (RA);
scheduling request (SR);
power headroom reporting (PHR);
consistent listen-before-talk (LBT) failure recovery;
beam failure recovery (BFR);
pre-emptive buffer status reports (BSR);
recommended bit rate query;
uplink (UL) configured grant (CG) confirmation;
sidelink (SL) CG confirmation; and
desired guard symbol (DSG) query.

In some of these embodiments, one or more of the following applies:

- ongoing RA procedures that are not caused by a BSR pending for transmission are cancelled, while ongoing RA procedures that are caused by a BSR pending for transmission are not cancelled; and
- ongoing SR procedures that are not caused by a BSR pending for transmission are cancelled, while ongoing SR procedures that are caused by a BSR pending for transmission are not cancelled.

In some embodiments, the one or more first operations performed on the MAC entity upon the suspension in block 2010 include the operations of sub-block 2012, where the UE can maintain (e.g., keep running) any BSR procedures, for LCHs of the MAC entity, that were ongoing upon the suspension of the MAC entity.

In some embodiments, the one or more first operations performed on the MAC entity upon the suspension in block 2010 include one or more of the following, denoted by corresponding sub-block numbers in parentheses:

(2013) setting new data indicators (NDIs) for ongoing UL hybrid ARQ (HARQ) processes to values of zero;
(2014) flushing soft buffers for ongoing DL HARQ processes;
(2015) resetting one or more active counters;
(2016) stopping or considering to be expired one or more running timers;
(2017) suspending one or more UL resource grants;
(2018) releasing one or more PUCCH resources; and
(2019) releasing one or more temporary identifiers assigned by the wireless network.

In some of these embodiments, the one or more running timers stopped or considered to be expired include all running timers, except at least one of the following is kept running upon the suspension:

- a first timer (e.g., retxBSR-Timer) that triggers a regular BSR; and
- a second timer (e.g., timeAlignmentTimer) that triggers a SR on a primary cell of the deactivated cell group (e.g., PSCell).

In some of these embodiments, the suspended UL resource grants include only type-1 UL CGs for all cells having an associated timer that has not expired. In some of these embodiments, the released PUCCH resources include PUCCH resources for all cells having an associated timer that has not expired, except PUCCH resources for transmitting SR.

In some embodiments, the one or more second operations performed in block 2020 while the MAC entity is suspended include one or more of the following, denoted by corresponding sub-block numbers:

(2021) initiating a BSR procedure to report UL data available for transmission via the deactivated SCG;
(2022) initiating a SR procedure when no PUSCH resources are available to transmit a BSR; and
(2025) initiating a RA procedure when no PUCCH resources are available to transmit a SR.

In some of these embodiments, the SR procedure is initiated in sub-block 2022 with substantially zero delay after determining that no PUSCH resources are available for transmitting a BSR. In other embodiments, initiating the BSR procedure in sub-block 2021 is based on availability of UL data for transmission in a subset of all logical channels (LCHs) of the MAC entity. In some of these embodiments, the subset of LCHs includes one or more of the following:

- only LCHs that are not associated with a split secondary RLC entity;
- only LCHs that belong to a logical channel group (LCG);
- only LCHs that carry delay-sensitive UL data; and
- particular LCHs indicated by the wireless network via RRC signaling.

In other embodiments, the one or more second operations performed in block 2020 while the MAC entity is suspended include one or more of the following, denoted by corresponding sub-block numbers:

(2023) monitoring availability of UL data on one or more LCHs of the MAC entity;
(2024) initiating a SR procedure based on detecting availably of UL data on at least one of the monitored LCHs; and (2025) initiating a RA procedure when no PUCCH resources are available to transmit a SR.

In some of these embodiments, initiating the SR procedure in sub-block 2024 can be further based on one or more of the following:

no other SR procedures have been initiated while the MAC entity has been suspended; or no physical UL PUSCH resources are available for transmitting a BSR.

In some of these embodiments, the monitored LCHs (e.g., in sub-block 2023) include one of the following subsets of all LCHs of the MAC entity:

only LCHs that are not associated with a split secondary RLC entity;

only LCHs that belong to an LCG;

only LCHs that carry delay-sensitive UL data; and particular LCHs indicated by the wireless network via RRC signaling.

In some embodiments, the one or more third operations performed in block 2030 upon reactivating the deactivated cell group include one or more of the following, denoted by corresponding sub-block numbers:

(2031) initiating a RA procedure on a primary cell of the reactivated cell group (e.g., PSCell);

(2032) resuming one or more suspended UL resource grants;

(2033) initiating a timer for periodic PHR;

(2034) resetting, to a predetermined initial value, respective prioritization parameters (e.g., Bj) associated with a plurality of LCHs of the MAC entity; and (2035) considering each LCH that belongs to an LCG to have zero UL data available for transmission.

In some embodiments, resuming the MAC entity based on the one or more third operations in block 2030 can include one or more of the following operations (e.g., upon which the MAC entity is considered as resumed):

(2036) initiating or resuming a BSR procedure for a plurality of LCHs of the MAC entity, based on prioritization parameters associated with the plurality of LCHs being reset to a predetermined initial value (e.g., as in block 2034);

(2037) sending an acknowledgement to a cell group activation command from the wireless network;

(2038) initiating a SR procedure in the reactivated cell group; and (2039) initiating a RA procedure in the reactivated cell group.

In some of these embodiments, the predetermined initial value to which the prioritization parameters are reset is zero.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 21:
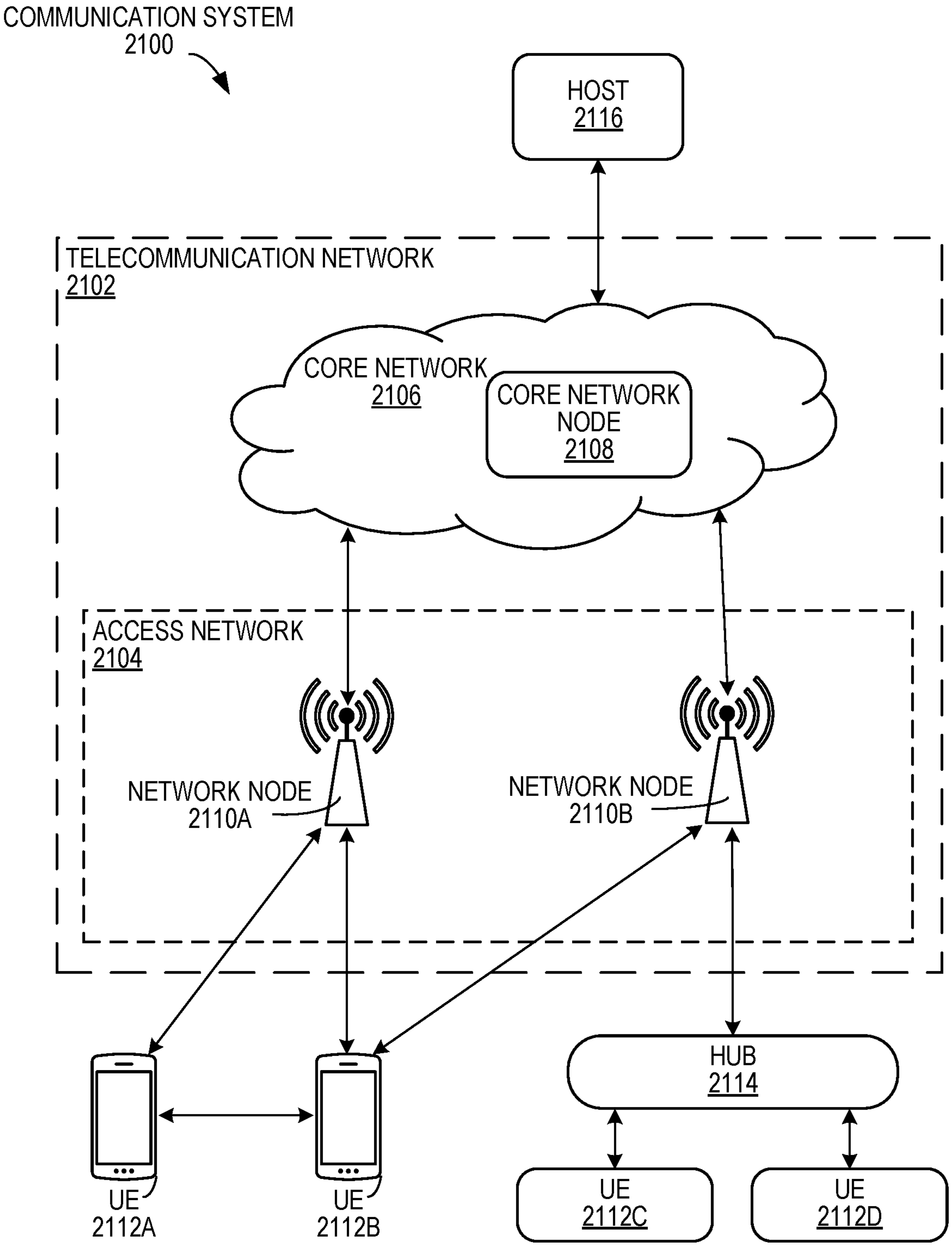
FIG. 21 shows a communication system according to various embodiments of the present disclosure.

FIG. 21 shows an example of a communication system 2100 in accordance with some embodiments. In this example, the communication system 2100 includes a telecommunication network 2102 that includes an access network 2104, such as a radio access network (RAN), and a core network 2106, which includes one or more core network nodes 2108. The access network 2104 includes one or more access network nodes, such as network nodes 2110*a* and 2110*b* (one or more of which may be generally referred to as network nodes 2110), or any other similar 3GPP access node or non-3GPP access point. The network nodes 2110 facilitate direct or indirect connection of UEs, such as by connecting UEs 2112*a*, 2112*b*, 2112*c*, and 2112*d* (one or more of which may be generally referred to as UEs 2112) to the core network 2106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 2100 may include any number of wired or wireless networks, network nodes, UEs, and/or any other components or systems that may facilitate or participate in the communication of data and/or signals whether via wired or wireless connections. The communication system 2100 may include and/or interface with any type of communication, telecommunication, data, cellular, radio network, and/or other similar type of system.

The UEs 2112 may be any of a wide variety of communication devices, including wireless devices arranged, configured, and/or operable to communicate wirelessly with the network nodes 2110 and other communication devices. Similarly, the network nodes 2110 are arranged, capable, configured, and/or operable to communicate directly or indirectly with the UEs 2112 and/or with other network nodes or equipment in the telecommunication network 2102 to enable and/or provide network access, such as wireless network access, and/or to perform other functions, such as administration in the telecommunication network 2102.

In the depicted example, the core network 2106 connects the network nodes 2110 to one or more hosts, such as host 2116. These connections may be direct or indirect via one or more intermediary networks or devices. In other examples, network nodes may be directly coupled to hosts. The core network 2106 includes one more core network nodes (e.g., core network node 2108) that are structured with hardware and software components. Features of these components may be substantially similar to those described with respect to the UEs, network nodes, and/or hosts, such that the descriptions thereof are generally applicable to the corresponding components of the core network node 2108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2116 may be under the ownership or control of a service provider other than an operator or provider of the access network 2104 and/or the telecommunication network 2102, and may be operated by the service provider or on behalf of the service provider. The host 2116 may host a variety of applications to provide one or more service. Examples of such applications include live and pre-recorded audio/video content, data collection services such as retrieving and compiling data on various ambient conditions detected by a plurality of UEs, analytics 20) functionality, social media, functions for controlling or otherwise interacting with remote devices, functions for an alarm and surveillance center, or any other such function performed by a server.

As a whole, the communication system 2100 of FIG. 21 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 2102 is a cellular network that implements 3GPP standardized features. Accordingly, the telecommunications network 2102 may support network slicing to provide different logical networks to different devices that are connected to the telecommunication network 2102. For example, the telecommunications network 2102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2112 are configured to transmit and/or receive information without direct human interaction. For instance, a UE may be designed to transmit information to the access network 2104 on a predetermined schedule, when triggered by an internal or external event, or in response to requests from the access network 2104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 2114 communicates with the access network 2104 to facilitate indirect communication between one or more UEs (e.g., UE 2112*c* and/or 2112*d*) and network nodes (e.g., network node 2110*b*). In some examples, the hub 2114 may be a controller, router, content source and analytics, or any of the other communication devices described herein regarding UEs. For example, the hub 2114 may be a broadband router enabling access to the core network 2106 for the UEs. As another example, the hub 2114 may be a controller that sends commands or instructions to one or more actuators in the UEs. Commands or instructions may be received from the UEs, network nodes 2110, or by executable code, script, process, or other instructions in the hub 2114. As another example, the hub 2114 may be a data collector that acts as temporary storage for UE data and, in some embodiments, may perform analysis or other processing of the data. As another example, the hub 2114 may be a content source. For example, for a UE that is a VR headset, display, loudspeaker or other media delivery device, the hub 2114 may retrieve VR assets, video, audio, or other media or data related to sensory information via a network node, which the hub 2114 then provides to the UE either directly, after performing local processing, and/or after adding additional local content. In still another example, the hub 2114 acts as a proxy server or orchestrator for the UEs, in particular in if one or more of the UEs are low energy IoT devices.

The hub 2114 may have a constant/persistent or intermittent connection to the network node 2110*b*. The hub 2114 may also allow for a different communication scheme and/or schedule between the hub 2114 and UEs (e.g., UE 2112*c* and/or 2112*d*), and between the hub 2114 and the core network 2106. In other examples, the hub 2114 is connected to the core network 2106 and/or one or more UEs via a wired connection. Moreover, the hub 2114 may be configured to connect to an M2M service provider over the access network 2104 and/or to another UE over a direct connection. In some scenarios, UEs may establish a wireless connection with the network nodes 2110 while still connected via the hub 2114 via a wired or wireless connection. In some embodiments, the hub 2114 may be a dedicated hub—that is, a hub whose primary function is to route communications to/from the UEs from/to the network node 2110*b*. In other embodiments, the hub 2114 may be a non-dedicated hub—that is, a device which is capable of operating to route communications between the UEs and network node 2110*b*, but which is additionally capable of operating as a communication start and/or end point for certain data channels.

Figure 22:
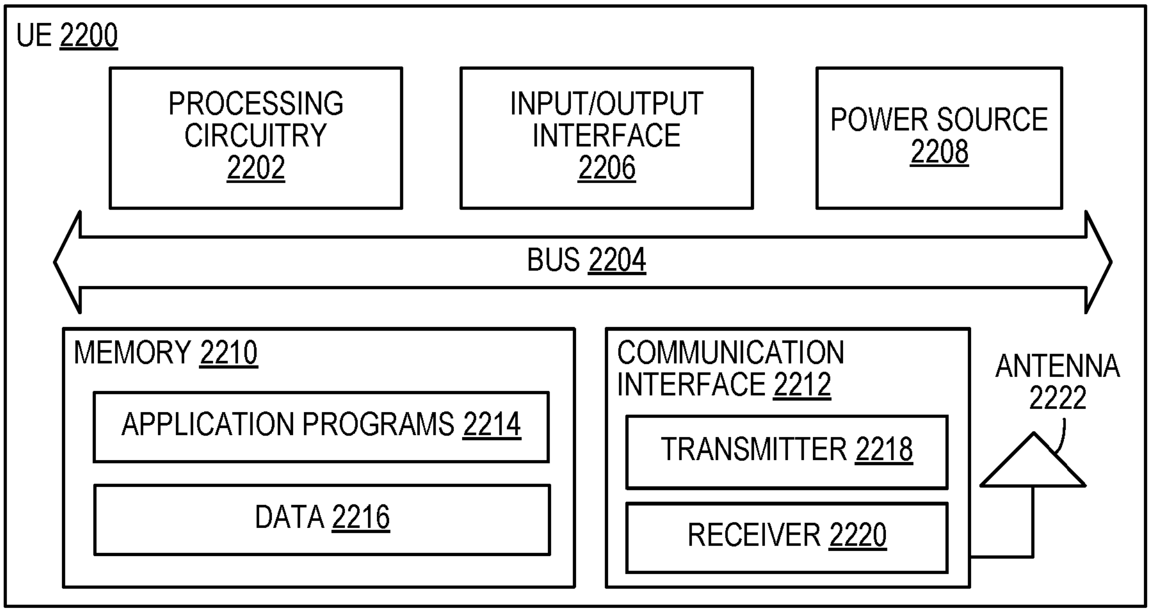
FIG. 22 shows a UE according to various embodiments of the present disclosure.

FIG. 22 shows a UE 2200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2200 includes processing circuitry 2202 that is operatively coupled via a bus 2204 to an input/output interface 2206, a power source 2208, a memory 2210, a communication interface 2212, and/or any other component, or any combination thereof. Certain UEs may utilize all or a subset of the components shown in FIG. 22. The level of integration between the components may vary from one UE to another UE. Further, certain UEs may contain multiple instances of a component, such as multiple processors, memories, transceivers, transmitters, receivers, etc.

The processing circuitry 2202 is configured to process instructions and data and may be configured to implement any sequential state machine operative to execute instructions stored as machine-readable computer programs in the memory 2210. The processing circuitry 2202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2202 may include multiple central processing units (CPUs).

In the example, the input/output interface 2206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2208 is structured as a battery or battery pack. Other types of power sources, such as an external power source (e.g., an electricity outlet), photovoltaic device, or power cell, may be used. The power source 2208 may further include power circuitry for delivering power from the power source 2208 itself, and/or an external power source, to the various parts of the UE 2200 via input circuitry or an interface such as an electrical power cable. Delivering power may be, for example, for charging of the power source 2208. Power circuitry may perform any formatting, converting, or other modification to the power from the power source 2208 to make the power suitable for the respective components of the UE 2200 to which power is supplied.

The memory 2210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2210 includes one or more application programs 2214, such as an operating system, web browser application, a widget, gadget engine, or other application, and corresponding data 2216. The memory 2210 may store, for use by the UE 2200, any of a variety of various operating systems or combinations of operating systems.

The memory 2210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2210 may allow the UE 2200 to access instructions, application programs and the like, stored on transitory or non-transitory memory media, to off-load data, or to upload data. An article of manufacture, such as one utilizing a communication system may be tangibly embodied as or in the memory 2210, which may be or comprise a device-readable storage medium.

The processing circuitry 2202 may be configured to communicate with an access network or other network using the communication interface 2212. The communication interface 2212 may comprise one or more communication subsystems and may include or be communicatively coupled to an antenna 2222. The communication interface 2212 may include one or more transceivers used to communicate, such as by communicating with one or more remote transceivers of another device capable of wireless communication (e.g., another UE or a network node in an access network). Each transceiver may include a transmitter 2218 and/or a receiver 2220 appropriate to provide network communications (e.g., optical, electrical, frequency allocations, and so forth). Moreover, the transmitter 2218 and receiver 2220 may be coupled to one or more antennas (e.g., antenna 2222) and may share circuit components, software or firmware, or alternatively be implemented separately.

In the illustrated embodiment, communication functions of the communication interface 2212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2200 shown in FIG. 22.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 23:
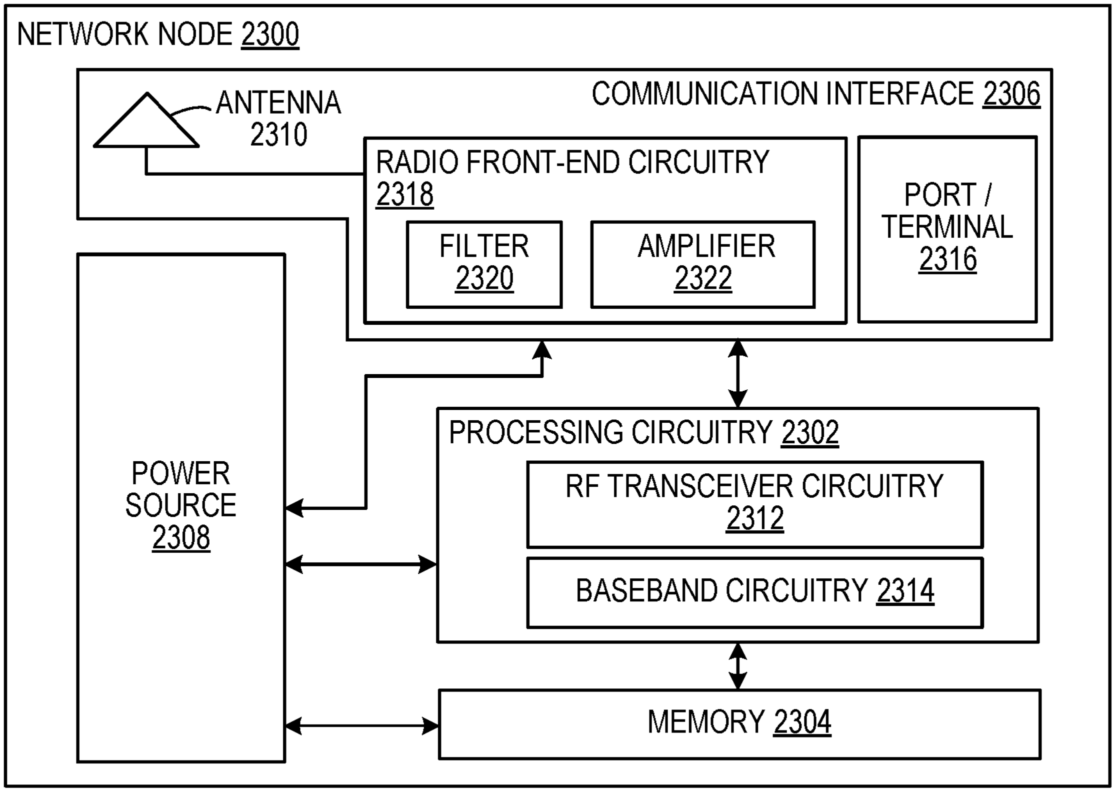
FIG. 23 shows a network node according to various embodiments of the present disclosure.

FIG. 23 shows a network node 2300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 2300 includes a processing circuitry 2302, a memory 2304, a communication interface 2306, and a power source 2308. The network node 2300 may be composed of multiple physically separate components (e.g., a NodeB component and a RNC component, or a BTS component and a BSC component, etc.), which may each have their own respective components. In certain scenarios in which the network node 2300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 2300 may be configured to support multiple radio access technologies (RATs). In such embodiments, some components may be duplicated (e.g., separate memory 2304 for different RATs) and some components may be reused (e.g., a same antenna 2310 may be shared by different RATs). The network node 2300 may also include multiple sets of the various illustrated components for different wireless technologies integrated into network node 2300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 2300.

The processing circuitry 2302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2300 components, such as the memory 2304, to provide network node 2300 functionality.

In some embodiments, the processing circuitry 2302 includes a system on a chip (SOC). In some embodiments, the processing circuitry 2302 includes one or more of radio frequency (RF) transceiver circuitry 2312 and baseband processing circuitry 2314. In some embodiments, the radio frequency (RF) transceiver circuitry 2312 and the baseband processing circuitry 2314 may be on separate chips (or sets of chips), boards, or units, such as radio units and digital units. In alternative embodiments, part or all of RF transceiver circuitry 2312 and baseband processing circuitry 2314 may be on the same chip or set of chips, boards, or units.

The memory 2304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 2302. The memory 2304 may store any suitable instructions, data, or information, including a computer program, software, an application including one or more of logic, rules, code, tables, and/or other instructions capable of being executed by the processing circuitry 2302 and utilized by the network node 2300. The memory 2304 may be used to store any calculations made by the processing circuitry 2302 and/or any data received via the communication interface 2306. In some embodiments, the processing circuitry 2302 and memory 2304 is integrated.

The communication interface 2306 is used in wired or wireless communication of signaling and/or data between a network node, access network, and/or UE. As illustrated, the communication interface 2306 comprises port(s)/terminal(s) 2316 to send and receive data, for example to and from a network over a wired connection. The communication interface 2306 also includes radio front-end circuitry 2318 that may be coupled to, or in certain embodiments a part of, the antenna 2310. Radio front-end circuitry 2318 comprises filters 2320 and amplifiers 2322. The radio front-end circuitry 2318 may be connected to an antenna 2310 and processing circuitry 2302. The radio front-end circuitry may be configured to condition signals communicated between antenna 2310 and processing circuitry 2302. The radio front-end circuitry 2318 may receive digital data that is to be sent out to other network nodes or UEs via a wireless connection. The radio front-end circuitry 2318 may convert the digital data into a radio signal having the appropriate channel and bandwidth parameters using a combination of filters 2320 and/or amplifiers 2322. The radio signal may then be transmitted via the antenna 2310. Similarly, when receiving data, the antenna 2310 may collect radio signals which are then converted into digital data by the radio front-end circuitry 2318. The digital data may be passed to the processing circuitry 2302. In other embodiments, the communication interface may comprise different components and/or different combinations of components.

In certain alternative embodiments, the network node 2300 does not include separate radio front-end circuitry 2318, instead, the processing circuitry 2302 includes radio front-end circuitry and is connected to the antenna 2310. Similarly, in some embodiments, all or some of the RF transceiver circuitry 2312 is part of the communication interface 2306. In still other embodiments, the communication interface 2306 includes one or more ports or terminals 2316, the radio front-end circuitry 2318, and the RF transceiver circuitry 2312, as part of a radio unit (not shown), and the communication interface 2306 communicates with the baseband processing circuitry 2314, which is part of a digital unit (not shown).

The antenna 2310 may include one or more antennas, or antenna arrays, configured to send and/or receive wireless signals. The antenna 2310 may be coupled to the radio front-end circuitry 2318 and may be any type of antenna capable of transmitting and receiving data and/or signals wirelessly. In certain embodiments, the antenna 2310 is separate from the network node 2300 and connectable to the network node 2300 through an interface or port.

The antenna 2310, communication interface 2306, and/or the processing circuitry 2302 may be configured to perform any receiving operations and/or certain obtaining operations described herein as being performed by the network node. Any information, data and/or signals may be received from a UE, another network node and/or any other network equipment. Similarly, the antenna 2310, the communication interface 2306, and/or the processing circuitry 2302 may be configured to perform any transmitting operations described herein as being performed by the network node. Any information, data and/or signals may be transmitted to a UE, another network node and/or any other network equipment.

The power source 2308 provides power to the various components of network node 2300 in a form suitable for the respective components (e.g., at a voltage and current level needed for each respective component). The power source 2308 may further comprise, or be coupled to, power management circuitry to supply the components of the network node 2300 with power for performing the functionality described herein. For example, the network node 2300 may be connectable to an external power source (e.g., the power grid, an electricity outlet) via an input circuitry or interface such as an electrical cable, whereby the external power source supplies power to power circuitry of the power source 2308. As a further example, the power source 2308 may comprise a source of power in the form of a battery or battery pack which is connected to, or integrated in, power circuitry. The battery may provide backup power should the external power source fail.

Embodiments of the network node 2300 may include additional components beyond those shown in FIG. 23 for providing certain aspects of the network node's functionality, including any of the functionality described herein and/or any functionality necessary to support the subject matter described herein. For example, the network node 2300 may include user interface equipment to allow input of information into the network node 2300 and to allow output of information from the network node 2300. This may allow a user to perform diagnostic, maintenance, repair, and other administrative functions for the network node 2300.

Figure 24:
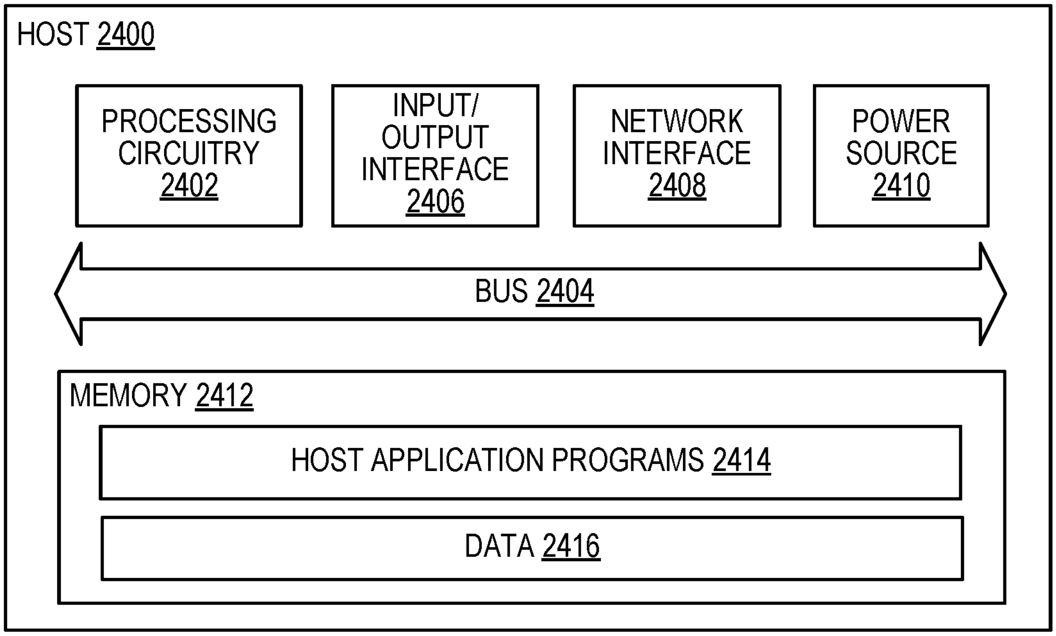
FIG. 24 shows host computing system according to various embodiments of the present disclosure.

FIG. 24 is a block diagram of a host 2400, which may be an embodiment of the host 2116 of FIG. 21, in accordance with various aspects described herein. As used herein, the host 2400 may be or comprise various combinations hardware and/or software, including a standalone server, a blade server, a cloud-implemented server, a distributed server, a virtual machine, container, or processing resources in a server farm. The host 2400 may provide one or more services to one or more UEs.

The host 2400 includes processing circuitry 2402 that is operatively coupled via a bus 2404 to an input/output interface 2406, a network interface 2408, a power source 2410, and a memory 2412. Other components may be included in other embodiments. Features of these components may be substantially similar to those described with respect to the devices of previous figures, such as FIGS. 22 and 23, such that the descriptions thereof are generally applicable to the corresponding components of host 2400.

The memory 2412 may include one or more computer programs including one or more host application programs 2414 and data 2416, which may include user data, e.g., data generated by a UE for the host 2400 or data generated by the host 2400 for a UE. Embodiments of the host 2400 may utilize only a subset or all of the components shown. The host application programs 2414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2414 may also provide for user authentication and licensing checks and may periodically report health, routes, and content availability to a central node, such as a device in or on the edge of a core network. Accordingly, the host 2400 may select and/or indicate a different host for over-the-top services for a UE. The host application programs 2414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 25:
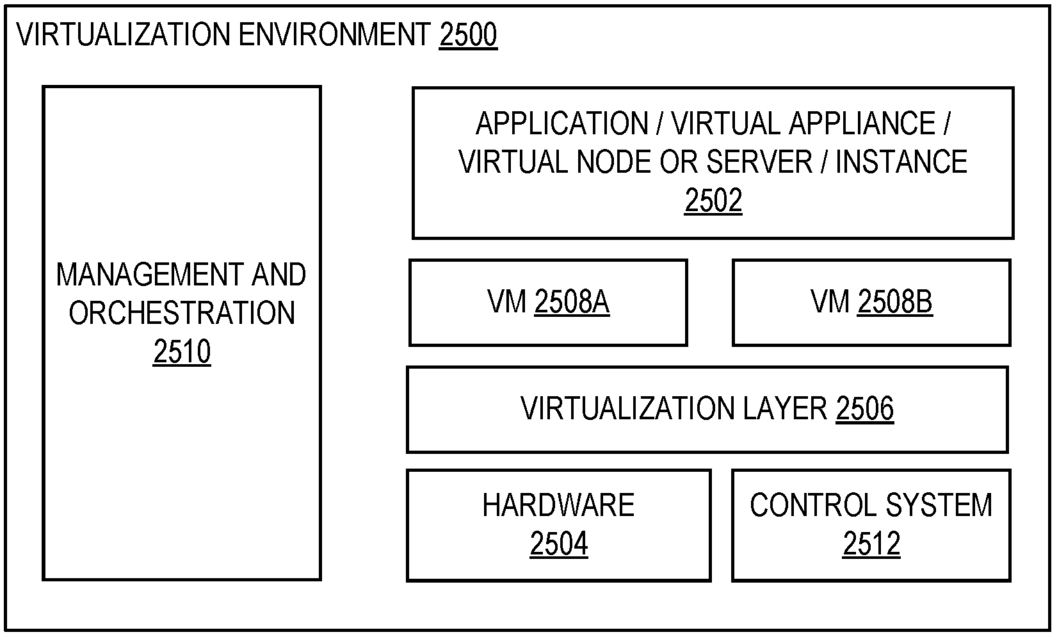
FIG. 25 is a block diagram of a virtualization environment in which functions implemented by some embodiments of the present disclosure may be virtualized.

FIG. 25 is a block diagram illustrating a virtualization environment 2500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2502 (which may alternatively be called software instances, virtual appliances, network functions, virtual nodes, virtual network functions, etc.) are run in the virtualization environment 2500 to implement some of the features, functions, and/or benefits of some of the embodiments disclosed herein.

Hardware 2504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 2506 (also referred to as hypervisors or virtual machine monitors (VMMs)), provide VMs 2508*a* and 2508*b* (one or more of which may be generally referred to as VMs 2508), and/or perform any of the functions, features and/or benefits described in relation with some embodiments described herein. The virtualization layer 2506 may present a virtual operating platform that appears like networking hardware to the VMs 2508.

The VMs 2508 comprise virtual processing, virtual memory, virtual networking or interface and virtual storage, and may be run by a corresponding virtualization layer 2506. Different embodiments of the instance of a virtual appliance 2502 may be implemented on one or more of VMs 2508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2508 may be a software implementation of a physical machine that runs programs as if they were executing on a physical, non-virtualized machine. Each of the VMs 2508, and that part of hardware 2504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2508 on top of the hardware 2504 and corresponds to the application 2502.

Hardware 2504 may be implemented in a standalone network node with generic or specific components. Hardware 2504 may implement some functions via virtualization. Alternatively, hardware 2504 may be part of a larger cluster of hardware (e.g., such as in a data center or CPE) where many hardware nodes work together and are managed via management and orchestration 2510, which, among others, oversees lifecycle management of applications 2502. In some embodiments, hardware 2504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2512 which may alternatively be used for communication between hardware nodes and radio units.

Figure 26:
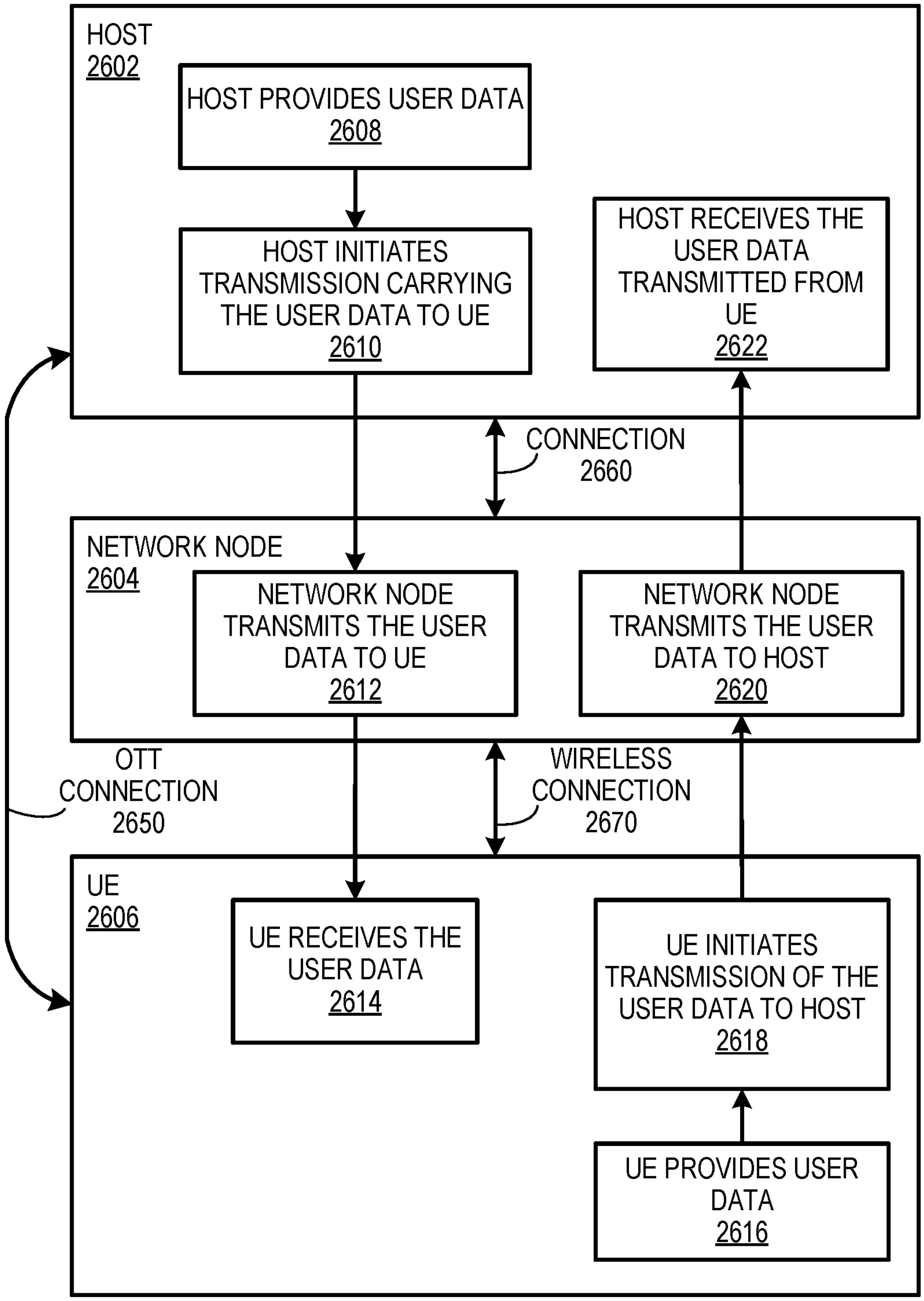
FIG. 26 illustrates communication between a host computing system, a network node, and a UE via multiple connections, at least one of which is wireless, according to various embodiments of the present disclosure.

FIG. 26 shows a communication diagram of a host 2602 communicating via a network node 2604 with a UE 2606 over a partially wireless connection in accordance with some embodiments. Example implementations, in accordance with various embodiments, of the UE (such as a UE 2112*a* of FIG. 21 and/or UE 2200 of FIG. 22), network node (such as network node 2110*a* of FIG. 21 and/or network node 2300 of FIG. 23), and host (such as host 2116 of FIG. 21 and/or host 2400 of FIG. 24) discussed in the preceding paragraphs will now be described with reference to FIG. 26.

Like host 2400, embodiments of host 2602 include hardware, such as a communication interface, processing circuitry, and memory. The host 2602 also includes software, which is stored in or accessible by the host 2602 and executable by the processing circuitry. The software includes a host application that may be operable to provide a service to a remote user, such as the UE 2606 connecting via an over-the-top (OTT) connection 2650 extending between the UE 2606 and host 2602. In providing the service to the remote user, a host application may provide user data which is transmitted using the OTT connection 2650.

The network node 2604 includes hardware enabling it to communicate with the host 2602 and UE 2606. The connection 2660 may be direct or pass through a core network (like core network 2106 of FIG. 21) and/or one or more other intermediate networks, such as one or more public, private, or hosted networks. For example, an intermediate network may be a backbone network or the Internet.

The UE 2606 includes hardware and software, which is stored in or accessible by UE 2606 and executable by the UE's processing circuitry. The software includes a client application, such as a web browser or operator-specific "app" that may be operable to provide a service to a human or non-human user via UE 2606 with the support of the host 2602. In the host 2602, an executing host application may communicate with the executing client application via the OTT connection 2650 terminating at the UE 2606 and host 2602. In providing the service to the user, the UE's client application may receive request data from the host's host application and provide user data in response to the request data. The OTT connection 2650 may transfer both the request data and the user data. The UE's client application may interact with the user to generate the user data that it provides to the host application through the OTT connection 2650.

The OTT connection 2650 may extend via a connection 2660 between the host 2602 and the network node 2604 and via a wireless connection 2670 between the network node 2604 and the UE 2606 to provide the connection between the host 2602 and the UE 2606. The connection 2660 and wireless connection 2670, over which the OTT connection 2650 may be provided, have been drawn abstractly to illustrate the communication between the host 2602 and the UE 2606 via the network node 2604, without explicit reference to any intermediary devices and the precise routing of messages via these devices.

As an example of transmitting data via the OTT connection 2650, in step 2608, the host 2602 provides user data, which may be performed by executing a host application. In some embodiments, the user data is associated with a particular human user interacting with the UE 2606. In other embodiments, the user data is associated with a UE 2606 that shares data with the host 2602 without explicit human interaction. In step 2610, the host 2602 initiates a transmission carrying the user data towards the UE 2606. The host 2602 may initiate the transmission responsive to a request transmitted by the UE 2606. The request may be caused by human interaction with the UE 2606 or by operation of the client application executing on the UE 2606. The transmission may pass via the network node 2604, in accordance with the teachings of the embodiments described throughout this disclosure. Accordingly, in step 2612, the network node 2604 transmits to the UE 2606 the user data that was carried in the transmission that the host 2602 initiated, in accordance with the teachings of the embodiments described throughout this disclosure. In step 2614, the UE 2606 receives the user data carried in the transmission, which may be performed by a client application executed on the UE 2606 associated with the host application executed by the host 2602.

In some examples, the UE 2606 executes a client application which provides user data to the host 2602. The user data may be provided in reaction or response to the data received from the host 2602. Accordingly, in step 2616, the UE 2606 may provide user data, which may be performed by executing the client application. In providing the user data, the client application may further consider user input received from the user via an input/output interface of the UE 2606. Regardless of the specific manner in which the user data was provided, the UE 2606 initiates, in step 2618, transmission of the user data towards the host 2602 via the network node 2604. In step 2620, in accordance with the teachings of the embodiments described throughout this disclosure, the network node 2604 receives user data from the UE 2606 and initiates transmission of the received user data towards the host 2602. In step 2622, the host 2602 receives the user data carried in the transmission initiated by the UE 2606.

One or more of the various embodiments improve the performance of OTT services provided to the UE 2606 using the OTT connection 2650, in which the wireless connection 2670 forms the last segment. More precisely, these embodiments can facilitate suspension and resumption of a MAC entity to support SCG deactivation and reactivation and its corresponding reduction in UE energy consumption, such as by allowing a UE to trigger a BSR procedure and/or a data volume report in a fast and reliable way. In this manner, the network can be quickly informed about a UE's need for reactivation of a deactivated SCG (e.g., due to UL traffic arrival), which can reduce and/or minimize transmission latency of UL data. Both users and providers of OTT services will benefit from these improvements to energy consumption and data latency, which will make these OTT services more valuable to both types of entities.

In an example scenario, factory status information may be collected and analyzed by the host 2602. As another example, the host 2602 may process audio and video data which may have been retrieved from a UE for use in creating maps. As another example, the host 2602 may collect and analyze real-time data to assist in controlling vehicle congestion (e.g., controlling traffic lights). As another example, the host 2602 may store surveillance video uploaded by a UE. As another example, the host 2602 may store or control access to media content such as video, audio, VR or AR which it can broadcast, multicast or unicast to UEs. As other examples, the host 2602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2650 between the host 2602 and UE 2606, in response to variations in the measurement results. The measurement procedure and/or the network functionality for reconfiguring the OTT connection may be implemented in software and hardware of the host 2602 and/or UE 2606. In some embodiments, sensors (not shown) may be deployed in or in association with other devices through which the OTT connection 2650 passes; the sensors may participate in the measurement procedure by supplying values of the monitored quantities exemplified above by or supplying values of other physical quantities from which software may compute or estimate the monitored quantities. The reconfiguring of the OTT connection 2650 may include message format, retransmission settings, preferred routing etc.; the reconfiguring need not directly alter the operation of the network node 2604. Such procedures and functionalities may be known and practiced in the art. In certain embodiments, measurements may involve proprietary UE signaling that facilitates measurements of throughput, propagation times, latency and the like, by the host 2602. The measurements may be implemented in that software causes messages to be transmitted, in particular empty or 'dummy' messages, using the OTT connection 2650 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

The techniques and apparatus described herein include, but are not limited to, the following enumerated examples:

A1. A method for a user equipment (UE) configured to communicate with a wireless network via a master cell group (MCG) and a secondary cell group (SCG), the method comprising:
- upon deactivating the SCG, suspending a medium access control (MAC) entity associated with the SCG and performing one or more first operations on the MAC entity upon suspension;
- while the MAC entity is suspended, performing one or more second operations related to reporting of uplink (UL) data available for transmission via the SCG; and
- upon reactivating the SCG, resuming the MAC entity and performing one or more third operations on the MAC entity upon resuming.

A2. The method of embodiment A1, wherein performing the first operations on the MAC entity upon suspension includes cancelling one or more of the following procedures that are ongoing:
- random access (RA);
- scheduling request (SR);
- power headroom reporting (PHR);
- consistent listen-before-talk (LBT) failure recovery;
- beam failure recovery (BFR);
- pre-emptive buffer status reporting (BSR);
- recommended bit rate query;
- uplink (UL) configured gran (CG) confirmation;
- sidelink (SL) CG confirmation; and
- desired guard symbol (DSG) query.

A3. The method of embodiment A2, wherein one or more of the following applies:
- ongoing RA procedures that are not caused by a BSR pending for transmission are cancelled, while ongoing RA procedures that are caused by a BSR pending for transmission are not cancelled; and
- ongoing SR procedures that are not caused by a BSR pending for transmission are cancelled, while ongoing SR procedures that are caused by a BSR pending for transmission are not cancelled.

A4. The method of any of embodiments A1-A3, wherein performing the first operations on the MAC entity upon suspension includes one or more of the following:
- setting new data indicators (NDIs) for all ongoing UL hybrid ARQ (HARQ) processes to values of zero;
- flushing soft buffers for respective ongoing downlink (DL) HARQ processes;
- resetting one or more active counters;
- stopping one or more running timers;
- considering one or more running timers to be expired;
- suspending one or more UL resource grants or DL resource assignments;

releasing one or more physical UL control channel (PUCCH) resources; and releasing any temporary identifiers assigned by the wireless network.

A5. The method of embodiment A4, wherein the one or more running timers include all running timers, except at least one of the following is kept running upon suspension:

a first timer that triggers a regular buffer status report (BSR); and a second timer that triggers a scheduling request (SR) on a primary cell (PCell) of the MCG.

A6. The method of any of embodiments A4-A5, wherein the suspended UL resource grants include only type-1 UL configured grants (CGs) for all cells having an associated timer that has not expired.

A7. The method of any of embodiments A4-A6, wherein the released PUCCH resources include PUCCH resources for all cells having an associated timer that has not expired, except PUCCH resources for transmitting scheduling requests (SR).

A8. The method of any of embodiments A1-A7, wherein performing the first operations on the MAC entity upon suspension includes maintaining any ongoing buffer status reporting (BSR) procedures.

A9. The method of any of embodiments A1-A8, wherein the second operations performed while the MAC entity is suspended include the following:

initiating a buffer status reporting (BSR) procedure to report UL data available for transmission via the SCG;

initiating a scheduling request (SR) procedure when no physical UL shared channel (PUSCH) resources are available to transmit a BSR; and initiating a random access (RA) procedure when no physical UL control channel (PUCCH) resources are available to transmit a SR.

A10. The method of embodiment A9, wherein the SR procedure is initiated with substantially zero delay after determining that no PUSCH resources are available for transmitting a BSR.

A11. The method of embodiment A9, wherein initiating the BSR procedure is based on availability of UL data for transmission in a subset of all logical channels (LCHs) of the MAC entity.

A12. The method of embodiment A11, wherein the subset of LCHs includes one or more of the following:

only LCHs that are not associated with a split secondary radio link control (RLC) entity;

only LCHs that belong to a logical channel group (LCG);

only LCHs that carry delay-sensitive UL data; and particular LCHs indicated by the wireless network via radio resource control (RRC) signaling.

A13. The method of any of embodiments A1-A8, wherein the second operations performed while the MAC entity is suspended include the following:

monitoring availability of UL data on one or more logical channels (LCH) of the MAC entity;

initiating a scheduling request (SR) procedure based on detecting availably of UL data on at least one of the monitored LCHs; and initiating a random access (RA) procedure when no physical UL control channel (PUCCH) resources are available to transmit a SR.

A14. The method of embodiment A13, wherein initiating the SR procedure is further based on one or more of the following:

no other SR procedures have been initiated while the MAC entity has been suspended; or no physical UL shared channel (PUSCH) resources are available for transmitting a buffer status report (BSR).

A15. The method of any of embodiments A13-A14, wherein the monitored LCHs include one of the following subsets of all LCHs of the MAC entity:

only LCHs that are not associated with a split secondary radio link control (RLC) entity;

only LCHs that belong to a logical channel group (LCG);

only LCHs that carry delay-sensitive UL data; and particular LCHs indicated by the wireless network via radio resource control (RRC) signaling.

A16. The method of any of embodiments A1-A15, wherein the third operations performed upon resuming the MAC entity include one or more the following:

initiating a random access (RA) procedure on a primary SCG cell (PSCell);

resuming one or more suspended UL resource grants or DL resource assignments;

initiating a timer for periodic power headroom reporting (PHR);

resetting prioritization parameters for respective logical channels (LCH) of the MAC entity; and considering each LCH that belongs to a logical channel group (LCG) to have zero UL data available for transmission.

A17. The method of any of embodiments A1-A15, wherein resuming the MAC entity comprises one or more of the following:

initiating a buffer status reporting (BSR) procedure in the SCG;

sending an acknowledgement to a network command to activate the SCG;

initiating a scheduling request (SR) procedure in the SCG; and initiating a random access (RA) procedure in the SCG.

B1. A user equipment (UE) configured to communicate with a wireless network via a master cell group (MCG) and a secondary cell group (SCG), the UE comprising:

communication interface circuitry configured to communicate with the wireless network via the SCG and the MCG; and processing circuitry operatively coupled to the communication interface circuitry, whereby the processing circuitry and the communication interface circuitry are configured to perform operations corresponding to any of the methods of embodiments A1-A17.

B2. A user equipment (UE) configured to communicate with a wireless network via a master cell group (MCG) and a secondary cell group (SCG), the UE being further configured to perform operations corresponding to any of the methods of embodiments A1-A17.

B3. A non-transitory, computer-readable medium storing computer-executable instructions that, when executed by processing circuitry of a user equipment (UE) configured to communicate with a wireless network via a master cell group (MCG) and a secondary cell group (SCG), configure the UE to perform operations corresponding to any of the methods of embodiments A1-A17.

B4. A computer program product comprising computer-executable instructions that, when executed by processing circuitry of a user equipment (UE) configured to communicate with a wireless network via a master cell group (MCG) and a secondary cell group (SCG), configure the UE to perform operations corresponding to any of the methods of embodiments A1-A17.

The invention claimed is:

1. A method for a user equipment (UE) configured to communicate with a wireless network via a plurality of cell groups including a master cell group (MCG) and a secondary cell group (SCG), the method comprising:

upon deactivation of the SCG, performing one or more first operations on a medium access control (MAC) entity associated with the SCG, wherein the one or more first operations on the MAC entity include cancelling one or more ongoing MAC entity procedures;

while the SCG is deactivated, performing one or more second operations related to reporting of uplink (UL) data available for transmission via the SCG; and upon reactivation of the SCG, performing one or more third operations on the MAC entity, wherein the one or more third operations comprise resetting respective prioritization parameters for each logical channel of the MAC entity to a predetermined initial value of zero.

2. The method of claim 1, wherein one or more of the following MAC entity procedures are cancelled upon deactivation of the SCG:

random access (RA);
scheduling request (SR);
power headroom reporting (PHR);
consistent listen-before-talk (LBT) failure recovery;
beam failure recovery (BFR);
pre-emptive buffer status reports (BSR);
recommended bit rate query;
UL configured grant (CG) confirmation;
sidelink (SL) CG confirmation; and
desired guard symbol (DSG) query.

3. The method of claim 2, wherein one or more of the following applies:

ongoing RA procedures that are not caused by a BSR pending for transmission are cancelled, while ongoing RA procedures that are caused by a BSR pending for transmission are not cancelled; and ongoing SR procedures that are not caused by a BSR pending for transmission are cancelled, while ongoing SR procedures that are caused by a BSR pending for transmission are not cancelled.

4. The method of claim 1, wherein the one or more first operations performed on the MAC entity upon the deactivation of the SCG also include one or more of the following:

setting new data indicators (NDIs) for ongoing UL hybrid ARQ (HARQ) processes to values of zero;

flushing soft buffers for ongoing downlink (DL) HARQ processes;

resetting one or more active counters;

stopping or considering to be expired one or more running timers;

suspending one or more UL resource grants;

releasing one or more physical UL control channel (PUCCH) resources; and releasing one or more temporary identifiers assigned by the wireless network.

5. The method of claim 4, wherein the one or more running timers stopped or considered to be expired include all running timers, except at least one of the following is kept running upon the suspension:

a first timer that triggers a regular buffer status report (BSR); and a second timer that triggers a scheduling request (SR) on a primary cell (PCell) of the deactivated SCG.

6. The method of claim 4, wherein the suspended UL resource grants include only type-1 UL configured grants (CGs) for all cells having an associated timer that has not expired.

7. The method of claim 4, wherein the released PUCCH resources include PUCCH resources for all cells having an associated timer that has not expired, except PUCCH resources for transmitting scheduling requests.

8. The method of claim 1, wherein the one or more first operations performed upon the deactivation of the SCG also include maintaining any buffer status reporting (BSR) procedures, for logical channels of the MAC entity, that were ongoing upon the deactivation of the MAC entity.

9. The method of claim 1, wherein the one or more second operations performed while the SCG is deactivated include one or more of the following:

initiating a BSR procedure to report UL data available for transmission via the deactivated cell group;

initiating a scheduling request (SR) procedure when no physical UL shared channel, PUSCH, resources are available to transmit a BSR; and initiating a random access (RA) procedure when no physical UL control channel (PUCCH) resources are available to transmit a SR.

10. The method of claim 9, wherein one of the following applies:

the SR procedure is initiated with substantially zero delay after determining that no PUSCH resources are available for transmitting a BSR; or initiating the BSR procedure is based on availability of UL data for transmission in a subset of all logical channels (LCHs) of the MAC entity.

11. The method of claim 10, wherein the subset of LCHs includes one or more of the following:

only LCHs that are not associated with a split secondary radio link control (RLC) entity;

only LCHs that belong to a logical channel group (LCG);

only LCHs that carry delay-sensitive UL data; and particular LCHs indicated by the wireless network via radio resource control (RRC) signaling.

12. The method of claim 1, wherein the one or more second operations performed while the SCG is deactivated include monitoring availability of UL data on one or more logical channels (LCHs) of the MAC entity.

13. The method of claim 12, wherein the monitored LCHs include one of the following subsets of all LCHs of the MAC entity:

only LCHs that are not associated with a split secondary radio link control (RLC) entity;

only LCHs that belong to a logical channel group (LCG);

only LCHs that carry delay-sensitive UL data; and particular LCHs indicated by the wireless network via radio resource control (RRC) signaling.

14. The method of claim 1, wherein the one or more third operations performed upon reactivation of the SCG also include resuming one or more suspended UL resource grants.

15. A non-transitory, computer-readable medium storing computer-executable instructions that, when executed by processing circuitry of a user equipment (UE) configured to communicate with a wireless network via a plurality of cell groups including a master cell group (MCG) and a secondary cell group (SCG), configure the UE to perform the method of claim 1.

16. A user equipment (UE) configured to communicate with a wireless network via a plurality of cell groups, including a master cell group (MCG) and a secondary cell group (SCG), the UE comprising:

communication interface circuitry configured to communicate with the wireless network via the plurality of cell groups; and processing circuitry operatively coupled to the communication interface circuitry, wherein the processing circuitry and the communication interface circuitry are configured to:

upon deactivation of the SCG, perform one or more first operations on a medium access control (MAC) entity associated with the SCG, wherein the one or more first operations on the MAC entity include cancelling one or more ongoing MAC entity procedures;

while the SCG is deactivated, perform one or more second operations related to reporting of uplink (UL) data available for transmission via the SCG; and upon reactivation of the SCG, perform one or more third operations on the MAC entity, wherein the one or more third operations comprise resetting respective prioritization parameters for each logical channel of the MAC entity to a predetermined initial value of zero.

17. The UE of claim 16, wherein one or more of the following MAC entity procedures are cancelled upon deactivation of the SCG:

random access (RA);

scheduling request (SR);

power headroom reporting (PHR);

consistent listen-before-talk (LBT) failure recovery;

beam failure recovery (BFR);

pre-emptive buffer status reports (BSR);

recommended bit rate query;

UL configured grant (CG) confirmation;

sidelink (SL) CG confirmation; and desired guard symbol (DSG) query.

18. The UE of claim 16, wherein the one or more first operations performed on the MAC entity upon the deactivation of the SCG also include one or more of the following:

setting new data indicators (NDIs) for ongoing UL hybrid ARQ (HARQ) processes to values of zero;

flushing soft buffers for ongoing downlink (DL) HARQ processes;

resetting one or more active counters;

stopping or considering to be expired one or more running timers;

suspending one or more UL resource grants;

releasing one or more physical UL control channel (PUCCH) resources;

releasing one or more temporary identifiers assigned by the wireless network; and maintaining any buffer status reporting (BSR) procedures, for logical channels of the MAC entity, that were ongoing upon the deactivation of the SCG.

19. The UE of claim 16, wherein the one or more second operations performed while the SCG is deactivated include one or more of the following:

initiating a BSR procedure to report UL data available for transmission via the deactivated cell group;

initiating a scheduling request (SR) procedure when no physical UL shared channel, PUSCH, resources are available to transmit a BSR;

initiating a random access (RA) procedure when no physical UL control channel (PUCCH) resources are available to transmit a SR; and monitoring availability of UL data on one or more logical channels (LCHs) of the MAC entity.

20. The UE of claim 16, wherein the one or more third operations performed upon reactivation of the SCG also include resuming one or more suspended UL resource grants.

* * * * *